US012591389B2

(12) United States Patent
Jung et al.

(10) Patent No.: US 12,591,389 B2
(45) Date of Patent: Mar. 31, 2026

(54) MEMORY CONTROLLER AND OPERATION METHOD THEREOF FOR PERFORMING AN INTERLEAVING READ OPERATION

(71) Applicant: Samsung Electronics Co., Ltd.,
Suwon-si (KR)

(72) Inventors: Kwansuk Jung, Suwon-si (KR);
Sungwon Ko, Suwon-si (KR);
Hoyoung Chang, Suwon-si (KR);
Youngjin Cho, Suwon-si (KR)

(73) Assignee: Samsung Electronics Co., Ltd.,
Gyeonggi-do (KR)

( * ) Notice: Subject to any disclaimer, the term of this
patent is extended or adjusted under 35
U.S.C. 154(b) by 229 days.

(21) Appl. No.: 18/365,421

(22) Filed: Aug. 4, 2023

(65) Prior Publication Data

US 2024/0211170 A1 Jun. 27, 2024

(30) Foreign Application Priority Data

Dec. 23, 2022 (KR) ........................ 10-2022-0183421

(51) Int. Cl.
*G06F 3/06* (2006.01)
*G06F 11/10* (2006.01)

(52) U.S. Cl.
CPC ............ *G06F 3/0658* (2013.01); *G06F 3/061*
(2013.01); *G06F 3/0659* (2013.01); *G06F*
*3/0673* (2013.01); *G06F 11/1008* (2013.01)

(58) Field of Classification Search
CPC ...... G06F 3/0604; G06F 3/061; G06F 3/0658;
G06F 3/0659; G06F 3/0673; G06F
3/0679; G06F 11/1008; G06F 12/0292;
G06F 2212/1016; G06F 2212/1032;
G11C 16/26
See application file for complete search history.

(56) References Cited

U.S. PATENT DOCUMENTS

| | | | | |
|---|---|---|---|---|
| 5,764,881 | A | * | 6/1998 | Yoshida ............. G11B 20/1883 |
| 7,570,515 | B2 | | 8/2009 | Katayama et al. |
| 8,244,962 | B2 | | 8/2012 | Swing et al. |
| 8,819,328 | B2 | | 8/2014 | Lassa et al. |
| 9,535,607 | B2 | | 1/2017 | Yun et al. |

(Continued)

FOREIGN PATENT DOCUMENTS

| | | |
|---|---|---|
| KR | 10-2154781 B1 | 9/2020 |
| KR | 10-2293919 B1 | 8/2021 |

*Primary Examiner* — Larry T MacKall
(74) *Attorney, Agent, or Firm* — Harness, Dickey &
Pierce, P.L.C.

(57) ABSTRACT

An operation method of a memory controller includes sequentially transmitting a first read command for the first plane and a second read command for the second plane to the nonvolatile memory device, transmitting a first status read command corresponding to the first read command to the nonvolatile memory device, transmitting a first memory access command corresponding to the first read command to the nonvolatile memory device based on first status information, receiving first read data that is output from the nonvolatile memory device, skipping issuing of a status read command corresponding to the second read command and transmitting a second memory access command corresponding to the second read command to the nonvolatile memory device, after receiving the first read data, and receiving second read data that is output from the nonvolatile memory device.

20 Claims, 24 Drawing Sheets

(56)                    References Cited

U.S. PATENT DOCUMENTS

| | | | |
|---|---|---|---|
| 2011/0047440 A1* | 2/2011 | Blackmon | G06F 11/141 |
| | | | 714/764 |
| 2018/0075912 A1* | 3/2018 | Shimizu | G11C 7/1042 |
| 2018/0341403 A1 | 11/2018 | Canepa et al. | |
| 2021/0208815 A1 | 7/2021 | Park et al. | |
| 2021/0233593 A1 | 7/2021 | Palmer | |
| 2022/0011974 A1 | 1/2022 | Lee et al. | |
| 2022/0350541 A1 | 11/2022 | Na et al. | |
| 2023/0289083 A1* | 9/2023 | Shin | G06F 3/0679 |

* cited by examiner

MEMORY CONTROLLER AND OPERATION METHOD THEREOF FOR PERFORMING AN INTERLEAVING READ OPERATION

CROSS-REFERENCE TO RELATED APPLICATIONS

This application claims priority under 35 U.S.C. § 119 to Korean Patent Application No. 10-2022-0183421 filed on Dec. 23, 2022, in the Korean Intellectual Property Office, the disclosures of which are incorporated by reference herein in their entireties.

BACKGROUND

Example embodiments of the present inventive concepts described herein relate to semiconductor memories, and more particularly, relate to memory controllers and operation methods thereof.

A semiconductor memory device is classified as a volatile memory, which loses data stored therein when a power supply is turned off, such as a dynamic random access memory (DRAM) or a static RAM (SRAM), or a nonvolatile memory, which retains data stored therein even when a power supply is turned off, such as a flash memory, a phase-change RAM (PRAM), a magnetic RAM (MRAM), or resistive RAM (ReRAM), or a ferroelectric random access memory (FRAM).

A memory controller controls a nonvolatile memory device through various commands. For example, the nonvolatile memory device may perform a read operation on a plane in the nonvolatile memory device in response to a read command received from the memory controller.

In detail, in response to the received read command, the nonvolatile memory device may read data stored in the plane and may store the read data in a page buffer. The memory controller may read the data stored in the page buffer by issuing a follow-up command corresponding to the read command. For example, the memory controller may check status information of the plane by issuing a status read command and may read the data stored in the page buffer by issuing a memory access command.

SUMMARY

Some example embodiments of the present inventive concepts provide a memory controller controlling a nonvolatile memory device more efficiently and an operation method thereof.

According to some example embodiments, an operation method of a memory controller which controls a nonvolatile memory device including a first plane and a second plane to perform an interleaving read operation on the first and second planes may include sequentially transmitting a first read command for the first plane and a second read command for the second plane to the nonvolatile memory device, transmitting a first status read command corresponding to the first read command to the nonvolatile memory device, transmitting a first memory access command corresponding to the first read command to the nonvolatile memory device, based on first status information output from the nonvolatile memory device in response to the first status read command, receiving first read data that is output from the nonvolatile memory device in response to the first memory access command, after receiving the first read data, skipping issuing of a status read command corresponding to the second read command and transmitting a second memory access command corresponding to the second read command to the nonvolatile memory device, and receiving second read data that is output from the nonvolatile memory device in response to the second memory access command.

According to some example embodiments, an operation method of a memory controller which controls a nonvolatile memory device including a first plane and a second plane may include transmitting a first read command for the first plane and a second read command for the second plane to the nonvolatile memory device, reading first read data corresponding to the first plane from the nonvolatile memory device in response to a determination that status information of the first plane indicates a ready state, and after reading the first read data of the first plane, reading second read data corresponding to the second plane from the nonvolatile memory device based on an elapsed time after a point in time when the second read command is transmitted.

According to some example embodiments, a memory controller may include a command manager that is configured to output a first read command to control a nonvolatile memory device, and a status manager that includes a timer configured to measure a first elapsed time from a first point in time when the first read command is output and a compare circuit configured to store a skip time. The compare circuit may be configured to compare the measured first elapsed time with the skip time to generate a first control signal. The command manager may be configured to, based on the first control signal, skip issuing of a first status read command associated with the first read command and output a first memory access command associated with the first read command.

According to some example embodiments, an operation method of a memory controller which controls a nonvolatile memory device including a first plane and a second plane and stores a skip time, may include transmitting a first read command for the first plane to the nonvolatile memory device, comparing an elapsed time after outputting the first read command with the skip time, and in response to a determination that the elapsed time is longer than the skip time, skipping issuing of a status read command corresponding to the first read command and transmitting a first memory access command corresponding to the first read command to the nonvolatile memory device.

BRIEF DESCRIPTION OF THE DRAWINGS

The above and other objects and features of the present inventive concepts will become apparent by describing in detail some example embodiments thereof with reference to the accompanying drawings.

FIG. 4 is a block diagram illustrating a memory controller of FIG. 1 in detail.

Figure 17:
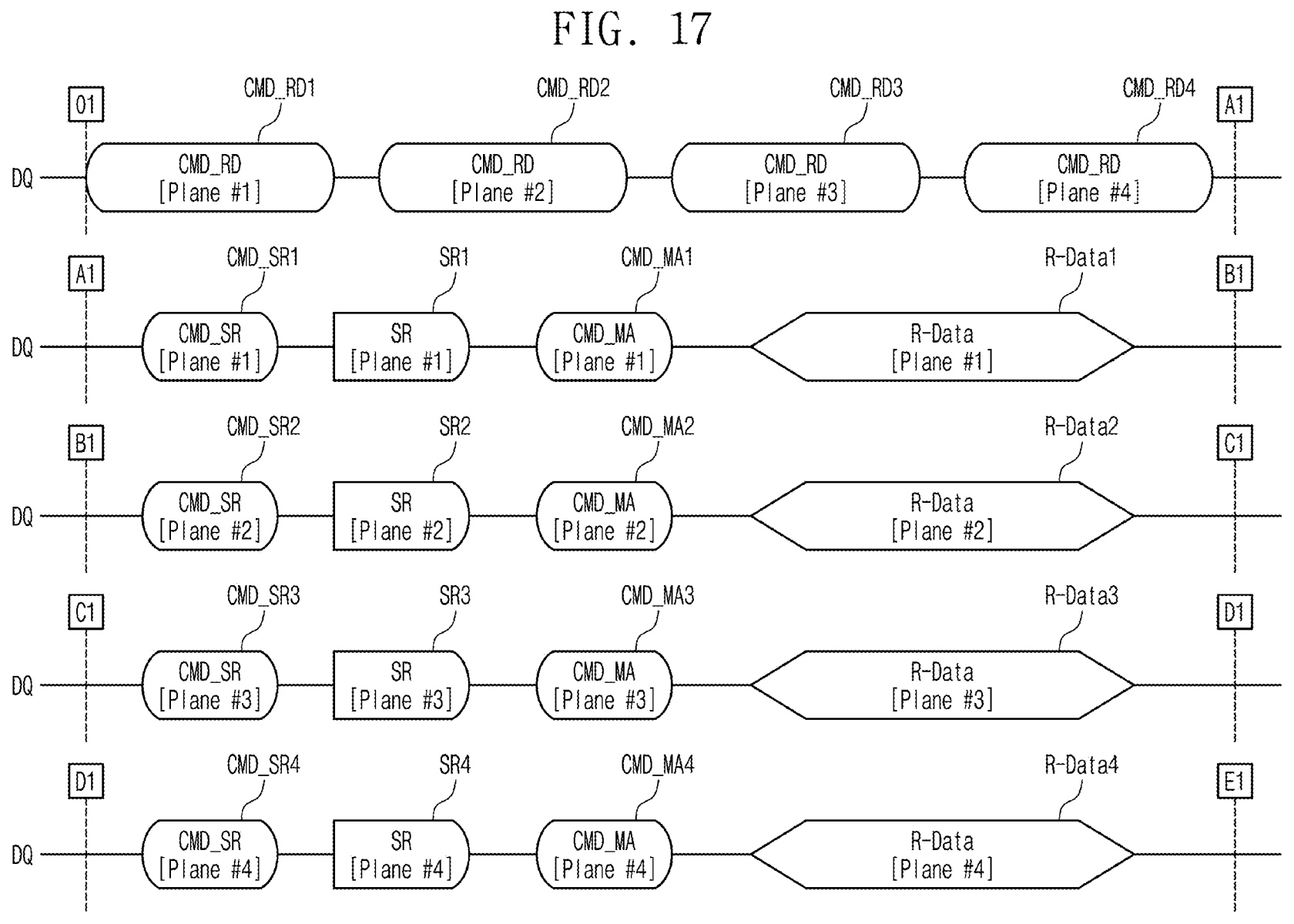

FIG. 17 is a timing diagram illustrating an operation in which a memory controller and a nonvolatile memory device of FIG. 15 perform an interleaving read operation according to some example embodiments.

Figure 22:
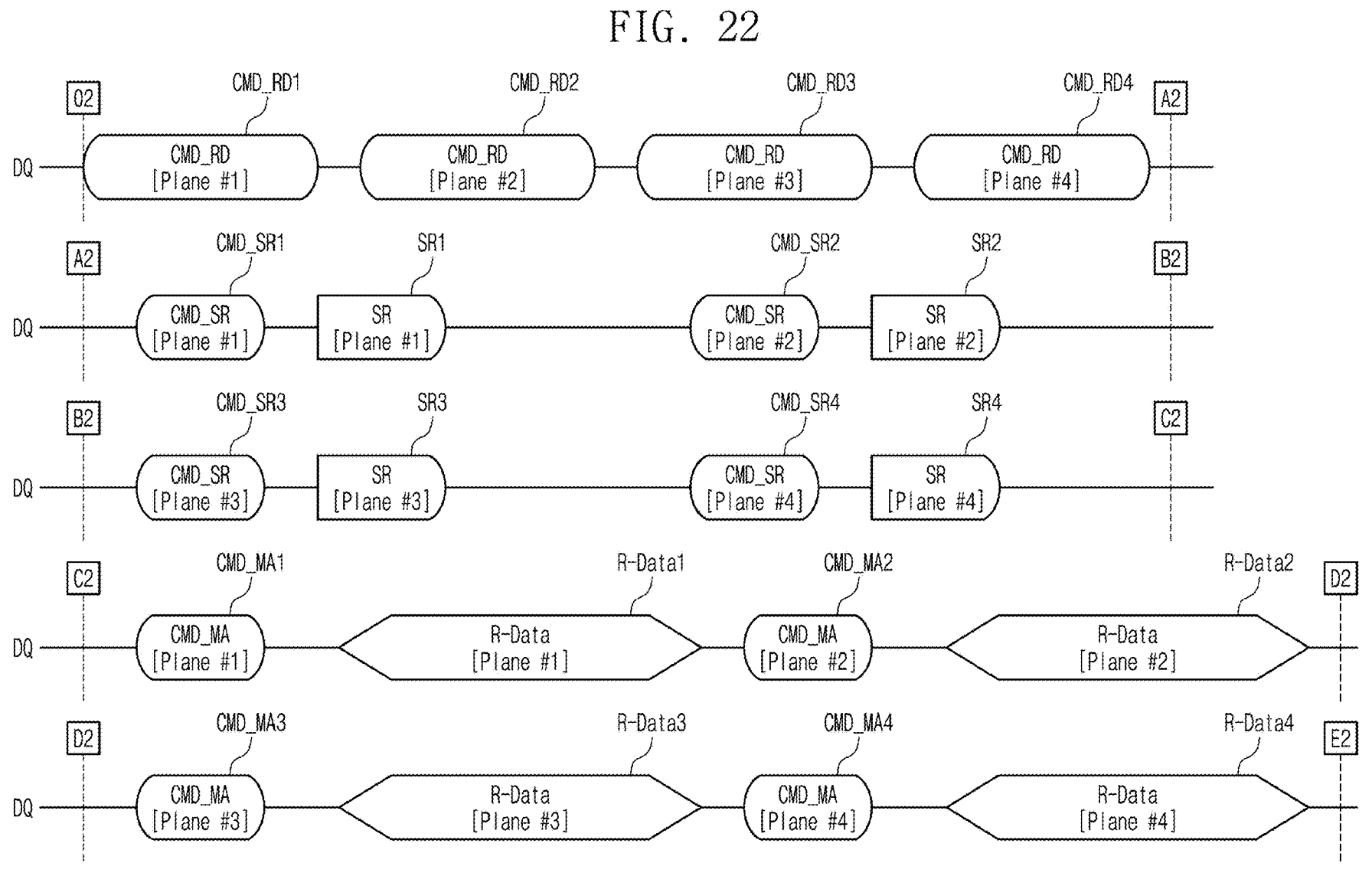

FIG. 22 is a timing diagram illustrating an operation in which a memory controller and a nonvolatile memory device of FIG. 15 perform an interleaving read operation according to some example embodiments.

DETAILED DESCRIPTION

Figure 1:
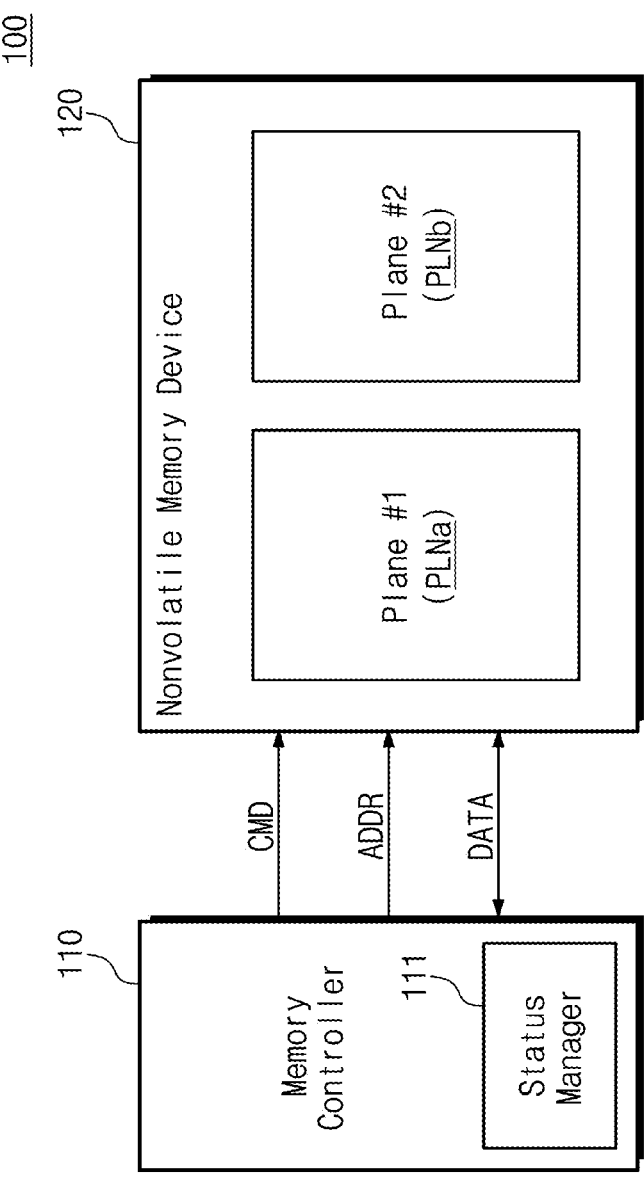
FIG. 1 is a block diagram illustrating a storage device according to some example embodiments of the present inventive concepts.

Below, some example embodiments of the present inventive concepts will be described in detail and clearly to such an extent that one skilled in the art easily carries out the present inventive concepts. In the following description, specific details such as detailed components and structures are merely provided to assist the overall understanding of example embodiments of the present inventive concepts. Therefore, it should be apparent to those skilled in the art that various changes and modifications of some example embodiments described herein may be made without departing from the scope and spirit of the present inventive concepts. In addition, the descriptions of well-known functions and structures are omitted for clarity and brevity. In the following drawings or in the detailed description, components may be connected with any other components except for components illustrated in a drawing or described in the detailed description. The terms described in the specification are terms defined in consideration of the functions in the present inventive concepts and are not limited to a specific function. The definitions of the terms should be determined based on the contents throughout the specification.

Components that are described in the detailed description with reference to the terms "circuit", "block", etc. will be implemented with software, hardware, or a combination thereof. For example, the software may be a machine code, firmware, an embedded code, and application software. For example, the hardware may include an electrical circuit, an electronic circuit, a processor, a computer, integrated circuit cores, a pressure sensor, a micro electro mechanical system (MEMS), a passive element, or a combination thereof.

It will be understood that elements and/or properties thereof may be recited herein as being "the same" or "equal" as other elements, and it will be further understood that elements and/or properties thereof recited herein as being "identical" to, "the same" as, or "equal" to other elements may be "identical" to, "the same" as, or "equal" to or "substantially identical" to, "substantially the same" as or "substantially equal" to the other elements and/or properties thereof. Elements and/or properties thereof that are "substantially identical" to, "substantially the same" as or "substantially equal" to other elements and/or properties thereof will be understood to include elements and/or properties thereof that are identical to, the same as, or equal to the other elements and/or properties thereof within manufacturing tolerances and/or material tolerances. Elements and/or properties thereof that are identical or substantially identical to and/or the same or substantially the same as other elements and/or properties thereof may be structurally the same or substantially the same, functionally the same or substantially the same, and/or compositionally the same or substantially the same. While the term "same," "equal" or "identical" may be used in description of some example embodiments, it should be understood that some imprecisions may exist. Thus, when one element is referred to as being the same as another element, it should be understood that an element or a value is the same as another element within a desired manufacturing or operational tolerance range (e.g., ±10%).

It will be understood that elements and/or properties thereof described herein as being "substantially" the same and/or identical encompasses elements and/or properties thereof that have a relative difference in magnitude that is equal to or less than 10%. Further, regardless of whether elements and/or properties thereof are modified as "substantially," it will be understood that these elements and/or properties thereof should be construed as including a manufacturing or operational tolerance (e.g., ±10%) around the stated elements and/or properties thereof.

When the terms "about" or "substantially" are used in this specification in connection with a numerical value, it is intended that the associated numerical value includes a manufacturing or operational tolerance (e.g., ±10%) around the stated numerical value. Moreover, when the words "about" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes. When ranges are specified, the range includes all values therebetween such as increments of 0.1%.

As described herein, when an operation is described to be performed, or an effect such as a structure is described to be established "by" or "through" performing additional operations, it will be understood that the operation may be performed and/or the effect/structure may be established "based on" the additional operations, which may include performing said additional operations alone or in combination with other further additional operations.

FIG. 1 is a block diagram illustrating a storage device according to some example embodiments of the present inventive concepts. Referring to FIG. 1, a storage device 100 may include a memory controller 110 and a nonvolatile memory device 120. In some example embodiments, the storage device 100 may be interchangeably referred to as a memory, a memory device, an electronic device, or the like.

The memory controller 110 may store data "DATA" in the nonvolatile memory device 120 or may read the data "DATA" stored in the nonvolatile memory device 120. For example, the memory controller 110 may transmit a command CMD and an address ADDR to the nonvolatile memory device 120 for the purpose of storing the data "DATA" in the nonvolatile memory device 120 or reading the data "DATA" stored in the nonvolatile memory device 120.

Below, it is assumed that the nonvolatile memory device 120 is a flash memory device and the storage device 100 is a solid state drive (SSD). However, the present inventive concepts are not limited thereto.

The nonvolatile memory device 120 may include a plurality of planes. For example, the nonvolatile memory device 120 may include a first plane (Plane #1) PLNa and a second plane (Plane #1) PLNb. Each of the first and second planes PLNa and PLNb may include a plurality of memory cells. In some example embodiments, the first plane PLNa may be referred to as a first plurality of memory cells and the second plane PLNb may be referred to as a second plurality of memory cells that are different from (e.g., exclude) the first plurality of memory cells. Below, some example embodiments in which the nonvolatile memory device 120 includes two planes will be described representatively. However, the present inventive concepts are not limited to the number of planes included in the nonvolatile memory device 120.

The nonvolatile memory device 120 may control at least one of the first or second planes PLNa or PLNb in response to the received address ADDR. For example, when the address ADDR received together with the command CMD includes an address of the first plane PLNa, the nonvolatile memory device 120 may control the first plane PLNa. Below, some example embodiments in which the read operation of the first plane PLNa is performed will be described representatively. However, the present inventive concepts are not limited thereto. For example, the nonvolatile memory device 120 may control the second plane PLNb in response to the received address ADDR.

The nonvolatile memory device 120 may perform the read operation on the first plane PLNa in response to the read command received from the memory controller 110.

In some example embodiments, while the data stored in the first plane PLNa are read, the first plane PLNa may be referred to as being in a busy state. In contrast, while the data are not read from the first plane PLNa, the first plane PLNa may be referred to as being in a ready state. As in the above description, the second plane PLNb may be in the busy state or the ready state depending on whether the read operation of the second plane PLNb is being performed.

The memory controller 110 may check the status of the first plane PLNa or the second plane PLNb by issuing the status read command. For example, the nonvolatile memory device 120 may return (e.g., transmit) status information of the first plane PLNa in response to the status read command.

The memory controller 110 may receive the data read from a plane checked as being in the ready state by issuing the memory access command. For example, after checking the first plane PLNa is in the ready state, the memory controller 110 may issue the memory access command for the first plane PLNa. In this case, the nonvolatile memory device 120 may provide the memory controller 110 with the data read from the first plane PLNa in response to the memory access command.

In some example embodiments, the memory controller 110 may predict the status of each of the first and second planes PLNa and PLNb and may issue the memory access command based on the predicted status. For example, the memory controller 110 may include a status manager 111. The status manager 111 may predict the status of each of the first and second planes PLNa and PLNb and may control the operation of the memory controller 110. In detail, the status manager 111 may predict the status of the first plane PLNa and may control whether to issue the status read command of the memory controller 110 (e.g., may selectively transmit or skip transmitting the status read command), based on the predicted status.

In some example embodiments, the status manager 111 may measure an elapsed time from a point in time when the memory controller 110 issues the read command for the first plane PLNa. The status manager 111 may predict whether the first plane PLNa is in the ready state, based on the elapsed time thus measured. When a sufficiently long time (e.g., an elapsed duration of time that is equal to or greater than a threshold duration value, also referred to herein as a skip time, which may be stored at the storage device 100, such as at the memory controller 110) passes from the point in time when the memory controller 110 issues the read command for the first plane PLNa, the status manager 111 may predict (e.g., determine) that the first plane PLNa is in the ready state. In this case (e.g., in response to such a determination), the status manager 111 may skip (e.g., selectively skip) the check of the status information of the first plane PLNa (e.g., selectively skip or refrain from transmitting the status read command corresponding to the read command for the first plane PLNa) and may issue the memory access command for the first plane PLNa. That is, the status manager 111 may skip to issue the status read command for the first plane PLNa. Restated, the memory controller 110 may transmit the memory access command for the first plane PLNa without having requested, received, and processed status information for the first plane PLNa to determine that the first plane PLNa is in the ready state (e.g., that a read operation of the first plane PLNa performed in response to the read command is completed). Further restated, the memory controller 110 may predict/determine that the first plane PLNa is ready, and in response to such prediction/determination transmit the memory access command for the first plane PLNa, without receiving status information for the first plane PLNa that indicates that the read operation of the first plane PLNa performed in response to the read command is completed.

According to some example embodiments of the present inventive concepts, when a sufficiently long time passes from a point in time when the read command for a specific plane is output (e.g., in response to a determination that a duration of time elapsed from the point in time when the read command for a specific plane is transmitted from the memory controller 110 is equal to or greater than a particular threshold value, such as a skip time, that may be stored at the storage device 100), the issuing of the status read command for the specific plane (e.g., a status read command corresponding to the read command for the specific plane) may be skipped. In this case, because a point in time when the memory controller 110 outputs the memory access command is advanced (e.g., the memory access command may be transmitted without having processed status information for the specific plane to determine that the specific plane is ready), the speed at which the storage device 100 performs the read operation may be improved. As a result, the operational performance of the storage device 100 and any electronic device, computing device, or the like including same may be improved, due to the improved speed at which the read operation may be performed based on selectively skipping the status read command transmission and instead advancing to transmitting the memory access command to prompt transmission of data from the nonvolatile memory device 120 to the memory controller 110 and further precluding the nonvolatile memory device 120 from transmitting status information in response to such a status read command and further precluding the memory controller 110 from performing operations to receive and process the status information to determine whether the read operation of a specific plane performed in response to the read command for the specific plane is completed and thus whether to transmit the memory access command. In addition, because the storage device 100 may be configured to perform a read operation where the memory controller 110 may transmit a memory access command for a plane without requesting status information to confirm that the read operation of the specific plane performed in response to the read command for the specific plane is completed, such that the nonvolatile memory device 120 may avoid processing the status read command and responsively transmitting the status information to the memory controller 110, and further such that the memory controller 110 may avoid processing the status information to determine whether to transmit the memory access command, the storage device 100 may be configured to perform the read operation with reduced power consumption due to avoiding the above-noted transmission and processing/determination operations regarding the status read command and the status information to perform the read operation. Therefore, the storage device 100 and any electronic device, computing device, or the like including same may be configured to reduce power consumption, operational speed, operational performance, or any combination thereof based on performing a read operation where the status read command transmission is selectively skipped (e.g., the storage device 100 performs at least one read operation to receive data DATA from the nonvolatile memory device 120 based on skipping status read command transmission and transmitting a memory access command for a plane without determining that the read operation of the plane performed in response to the read command for the plane is completed based on processing status information).

Figure 2:
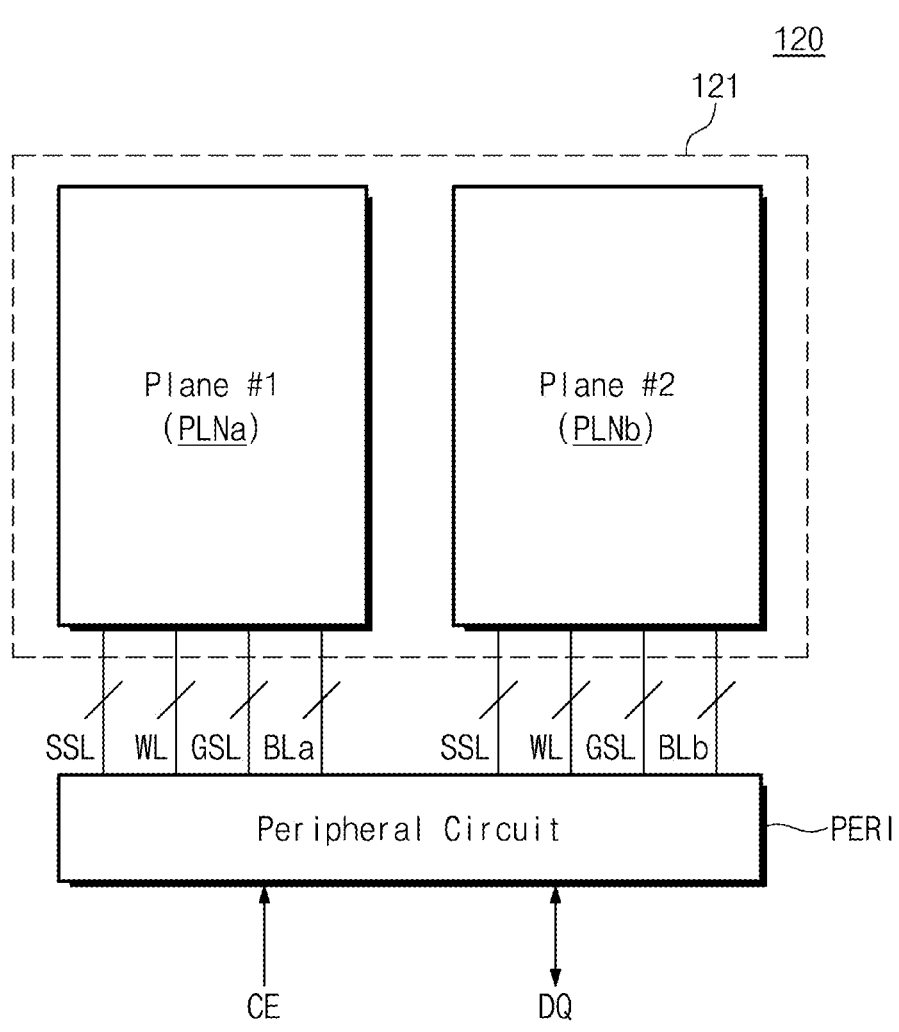
FIG. 2 is a block diagram illustrating a nonvolatile memory device of FIG. 1 in detail.

FIG. 2 is a block diagram illustrating a nonvolatile memory device of FIG. 1 in detail. Referring to FIGS. 1 and 2, the nonvolatile memory device 120 may include a memory cell array 121 and a peripheral circuit PERI.

The memory cell array 121 may include the first plane PLNa and the second plane PLNb. The first plane PLNa may be connected to the peripheral circuit PERI through string selection lines SSL, word lines WL, ground selection lines GSL, first bit lines BLa. The second plane PLNb may be connected to the peripheral circuit PERI through string selection lines SSL, word lines WL, ground selection lines GSL, second bit lines BLb.

Each of the first and second planes PLNa and PLNb may include a plurality of memory blocks. Each of the plurality of memory blocks may include a plurality of memory cells.

In some example embodiments, the plurality of memory blocks included in the first plane PLNa may share the first bit lines BLa. The plurality of memory blocks included in the second plane PLNb may share the second bit lines BLb. That is, the first plane PLNa and the second plane PLNb may be connected to different bit lines.

The peripheral circuit PERI may receive a chip enable signal CE from the memory controller 110. The peripheral circuit PERI may communicate the memory controller 110 through a plurality of data pins DQ. For example, the peripheral circuit PERI may exchange the command CMD, the address ADDR, and the data "DATA" with the memory controller 110 through the plurality of data pins DQ based on the chip enable signal CE.

Figure 3:
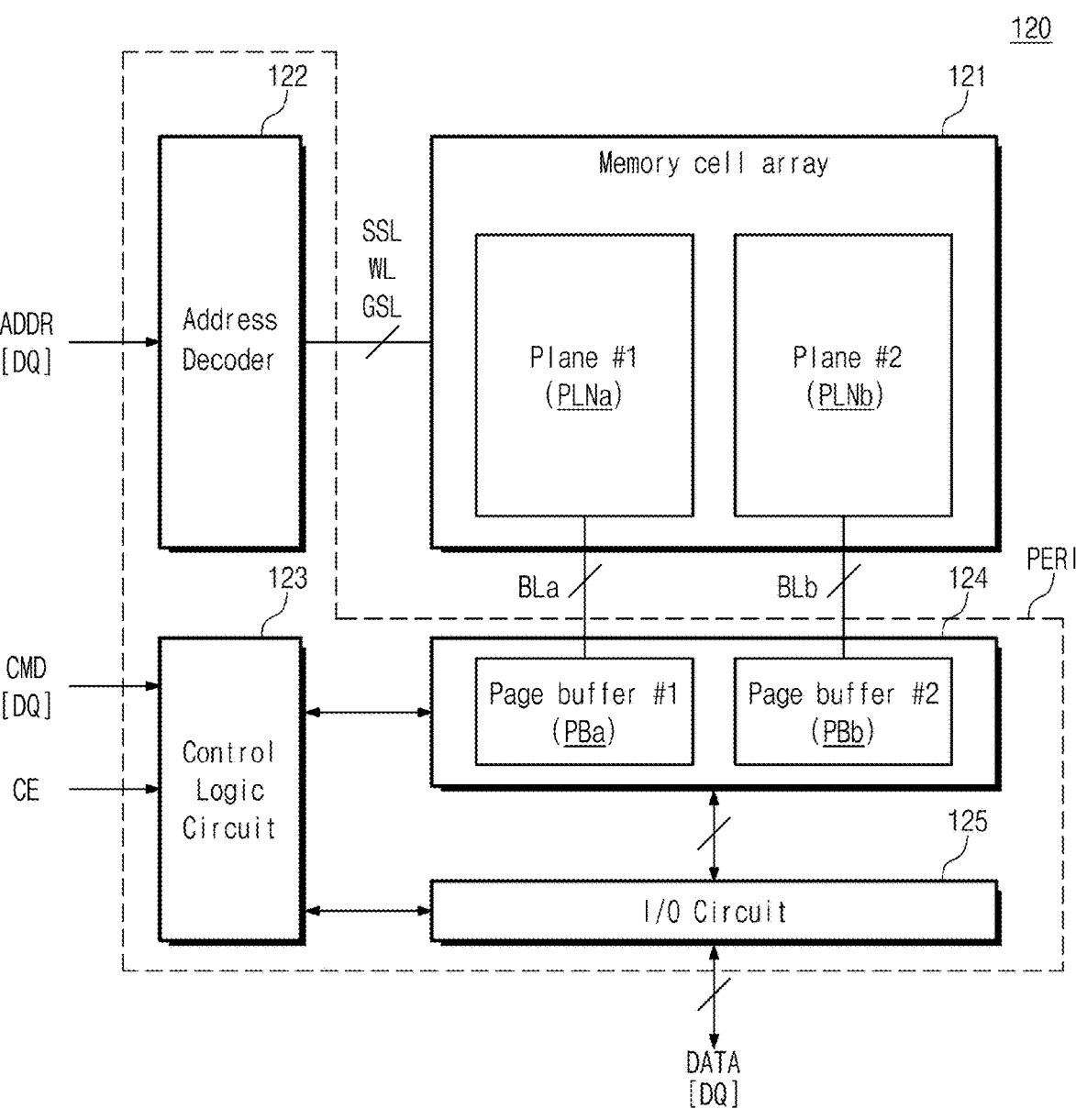
FIG. 3 is a block diagram illustrating a nonvolatile memory device of FIG. 2 in detail.

FIG. 3 is a block diagram illustrating a nonvolatile memory device of FIG. 2 in detail. Referring to FIGS. 1 to 3, the nonvolatile memory device 120 may include the memory cell array 121 and the peripheral circuit PERI. The configuration of the memory cell array 121 is described with reference to FIG. 2, and thus, additional description will be omitted to avoid redundancy.

For brief description, below, the description will be given described with reference to FIG. 2 as various signals such as the command CMD, the address ADDR, the data "DATA", etc. are directly provided to various function blocks through the plurality of data pins DQ, but the present inventive concepts are not limited thereto.

The peripheral circuit PERI may include an address decoder 122, a control logic circuit 123, a page buffer circuit 124, and an input/output (I/O) circuit 125.

The address decoder 122 may be connected to the memory cell array 121 through the string selection lines SSL, the word lines WL, and the ground selection lines GSL. The address decoder 122 may receive the address ADDR from the memory controller 110. The address decoder 122 may decode the address ADDR and may control the voltage levels of the string selection lines SSL, the word lines WL, and the ground selection lines GSL based on the decoded result.

The page buffer circuit 124 may be connected to the memory cell array 121 through the first bit lines BLa and the second bit lines BLb. For example, the page buffer circuit 124 may include a first page buffer (Page buffer #1) PBa and a second page buffer (Page buffer #2) PBb.

The first page buffer PBa may be configured to temporarily store the data read from the first plane PLNa through the first bit lines BLa or to temporarily store the data to be stored in the first plane PLNa. For example, the first page buffer PBa may store the data read from the first plane PLNa in response to the read command. The first page buffer PBa may output the stored data to the memory controller 110 through the input/output circuit 125 in response to the memory access command.

The second page buffer PBb may be configured to temporarily store the data read from the second plane PLNb through the second bit lines BLb or to temporarily store the data to be stored in the second plane PLNb. For example, the second page buffer PBb may store the data read from the second plane PLNb in response to the read command. The second page buffer PBb may output the stored data to the memory controller 110 through the input/output circuit 125 in response to the memory access command.

In some example embodiments, while the data stored in the memory cells of the first plane PLNa are stored in the first page buffer PBa (i.e., while there is performed the read operation in which the data of the memory cells of the first plane PLNa are read by the first page buffer PBa), the first plane PLNa may be referred to as being in the busy state. When the read operation of the first plane PLNa is completely performed (or when the first plane PLNa is not in the busy state), the first plane PLNa may be referred to as being in the ready state.

The control logic circuit 123 may receive the chip enable signal CE and the command CMD from the memory controller 110. For example, the control logic circuit 123 may receive the command CMD from the memory controller 110 in response to the chip enable signal CE. The control logic circuit 123 may control an overall operation of the nonvolatile memory device 120 based on the received command CMD.

The input/output circuit 125 may receive the data "DATA" from the page buffer circuit 124 and may output the received data "DATA" to the memory controller 110. Alternatively, the input/output circuit 125 may receive the data "DATA" from the memory controller 110 and may provide the received data "DATA" to the page buffer circuit 124.

In some example embodiments, when (e.g., in response to a determination that) the read command for the first plane PLNa is received from the memory controller 110, the nonvolatile memory device 120 may read the data present in the first plane PLNa so as to be stored in the first page buffer PBa. As in the above description, when (e.g., in response to a determination that) the read command for the second plane PLNb is received from the memory controller 110, the nonvolatile memory device 120 may read the data present in the second plane PLNb so as to be stored in the second page buffer PBb.

In some example embodiments, the command sequence of the read command may include a "00h" command, an address targeted for the read operation, and a "30h" command. In this case, the nonvolatile memory device 120 may perform the read operation on a plane corresponding to the address targeted for the read operation.

In some example embodiments, when (e.g., in response to a determination that) the status read command for the first plane PLNa is received from the memory controller 110, the nonvolatile memory device 120 may return (e.g., transmit) the status information of the first plane PLNa to the memory controller 110. That is, the control logic circuit 123 may return (e.g., transmit) information about (e.g., associated with, indicating, etc.) whether the read operation of the first plane PLNa performed in response to the read command is completed. As in the above description, when (e.g., in response to a determination that) the status read command for the second plane PLNb is received from the memory controller 110, the nonvolatile memory device 120 may return the status information of the second plane PLNb to the memory controller 110.

In some example embodiments, the command sequence of a status read command CMD_SR may include a "78h"

command and an address of the first plane PLNa. However, the present inventive concepts are not limited thereto. For example, the command sequence of the status read command CMD_SR may include a "70h" command instead of the "78h" command.

In some example embodiments, the status information may be transferred through a logic level of one of the plurality of data pins DQ. For example, status information SR may be transferred through a logic level of a sixth data pin among the plurality of data pins DQ. However, the present inventive concepts are not limited thereto.

In some example embodiments, when (e.g., in response to a determination that) the memory access command for the first plane PLNa is received from the memory controller 110, the control logic circuit 123 may control the first page buffer PBa such that the data stored in the first page buffer PBa are output (e.g., control the first page buffer PBa to cause the data stored in the first page buffer PBa to be transmitted) to the memory controller 110. As in the above description, when (e.g., in response to a determination that) the memory access command for the second plane PLNb is received from the memory controller 110, the control logic circuit 123 may control the second page buffer PBb such that the data stored in the second page buffer PBb are output (e.g., control the second page buffer PBb to cause the data stored in the second page buffer PBb to be transmitted) to the memory controller 110.

In some example embodiments, the command sequence of the memory access command may include the "00h" command, an address of a relevant plane, a "05h" command, a column address of data to be returned to the memory controller 110, and an "E0h" command. However, the present inventive concepts are not limited thereto.

In some example embodiments, the first plane PLNa and the second plane PLNb may share the plurality of data pins DQ. Accordingly, the first and second planes PLNa and PLNb and the memory controller 110 may sequentially transmit/receive the command CMD and the data "DATA".

Figure 4:
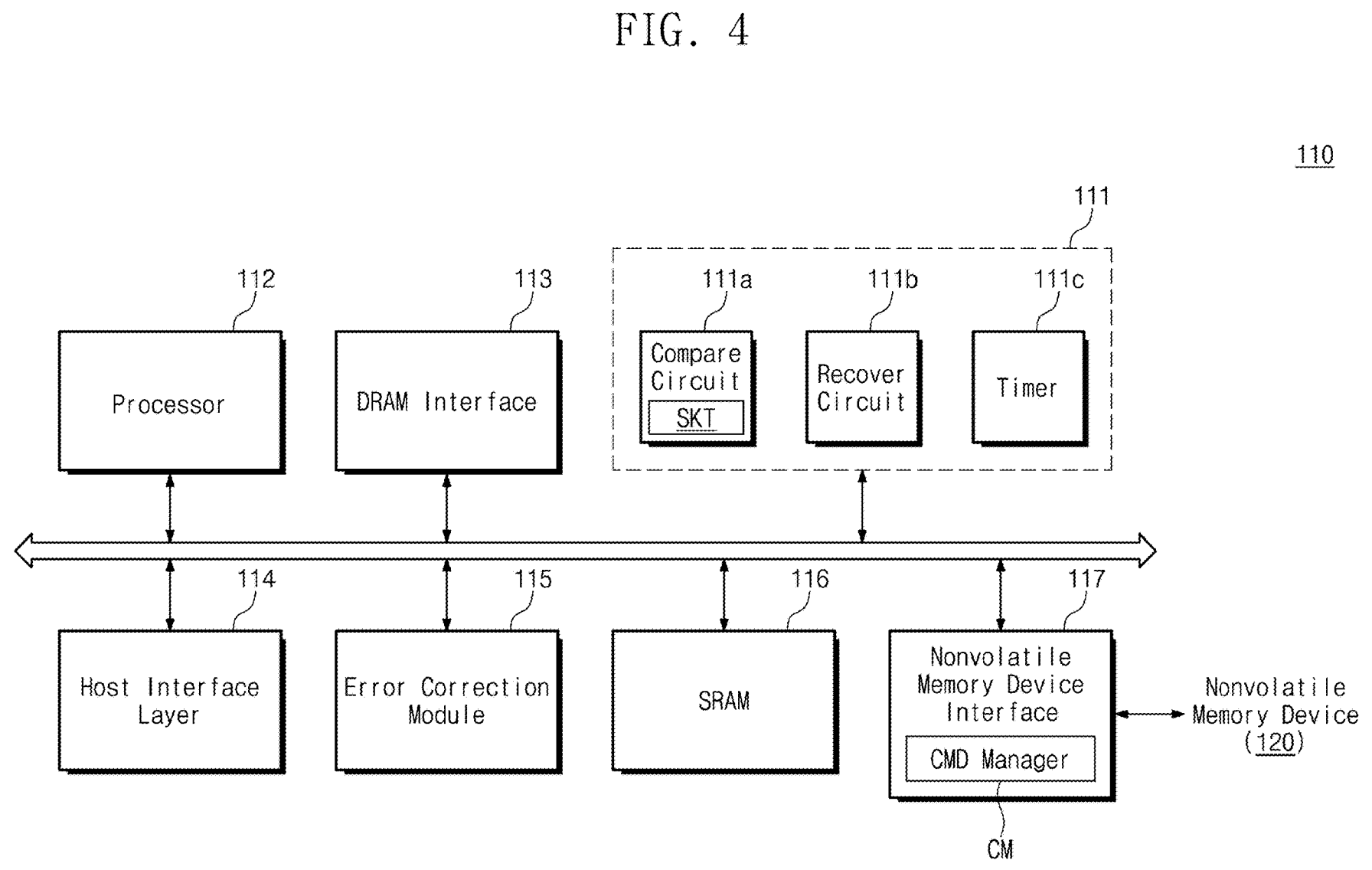

FIG. 4 is a block diagram illustrating a memory controller of FIG. 1 in detail. Referring to FIGS. 1 to 4, the memory controller 110 may include, implement, etc. the status manager 111, a processor 112, a dynamic random access memory (DRAM) interface 113, a host interface layer 114, an error correction module 115, a static random access memory (SRAM) 116, and a nonvolatile memory device interface 117. The status manager 111, the processor 112, the DRAM interface 113, the host interface layer 114, the error correction module 115, the SRAM 116, and the nonvolatile memory device interface 117 may be interconnected through a bus.

The memory controller 110 may communicate with a DRAM device (not illustrated) through the DRAM interface 113. For example, through the DRAM interface 113, the memory controller 110 may temporarily store the data in the DRAM device or may read the data stored in the DRAM device.

The memory controller 110 may communicate with a host device (not illustrated) through the host interface layer 114. In some example embodiments, the host interface layer 114 may include at least one of various host interfaces such as a PCI-express (Peripheral Component Interconnect express) interface, an NVMe (nonvolatile memory express) interface, a SATA (Serial ATA) interface, a SAS (Serial Attached SCSI) interface, and a UFS (Universal Flash Storage) interface.

The error correction module 115 may determine whether an uncorrectable error (e.g., any uncorrectable error, at least one uncorrectable error, etc.) is present in the data received from the nonvolatile memory device 120. When a correctable error is present in the data received from the nonvolatile memory device 120 (e.g., in response to a determination that a correctable error is present in the data received from the nonvolatile memory device 120), the error correction module 115 may correct the error. For example, the error correction module 115 may correct the correctable error by using one or more of various schemes such as a hamming code, a BCH (Bose-Chaudhuri-Hocquenghem) code, and an RS (Reed-Solomon) code. However, the present inventive concepts are not limited thereto.

The SRAM 116 may be used as a buffer memory, a working memory, or a cache memory of the memory controller 110. For example, the SRAM 116 may store various data such as a program, an application, and firmware executable by the processor 112.

The memory controller 110 may communicate with the nonvolatile memory device 120 through the nonvolatile memory device interface 117. For example, the nonvolatile memory device interface 117 may be a NAND interface.

The nonvolatile memory device interface 117 may include a command (CMD) manager CM. The command manager CM may issue various commands for controlling the nonvolatile memory device 120. For example, the command manager CM may issue various kinds of commands such as a program command, a read command, a status read command, and a memory access command.

The status manager 111 may include a compare circuit 111*a*, a recover circuit 111*b*, and a timer 111*c*.

The timer 111*c* may measure a time that passes (e.g., measure a value of an elapsed time, an elapsed duration, a duration of time, etc.) after the command manager CM transmits the read command to the nonvolatile memory device 120 (e.g., after a point in time at which the command manager CM transmits the read command to the nonvolatile memory device 120). The measured time may be a measured time value indicating a magnitude of the elapsed time after the point in time at which the command manager CM transmits the read command to the nonvolatile memory device 120. For example, the timer 111*c* may measure a time passing after the command manager CM transmits the read command for the first plane PLNa or a time passing after the command manager CM transmits the read command for the second plane PLNb.

The compare circuit 111*a* may store a skip time SKT. In some example embodiments, the skip time SKT may be referred to as a threshold time value, a threshold duration value, a threshold elapsed time value, or the like. The compare circuit 111*a* may compare the elapsed time measured by the timer 111*c* and the skip time SKT. The compare circuit 111*a* may control whether the command manager CM issues the status read command, based on the comparison result. The operations of the compare circuit 111*a* and the command manager CM will be described in detail with reference to FIGS. 9 to 12.

When the uncorrectable error (e.g., any uncorrectable error, at least one uncorrectable error, etc.) is detected by the error correction module 115 (e.g., in response to a determination that an uncorrectable error is included in data received from the nonvolatile memory device 120), the recover circuit 111*b* may allow the command manager CM to re-issue the memory access command. Also, the recover circuit 111*b* may dynamically change the skip time SKT stored in the compare circuit 111*a*. The operation of the recover circuit 111*b* will be described in detail with reference to FIGS. 13 and 14.

The processor 112 may control an overall operation of the memory controller 110. For example, the processor 112 may execute various applications (e.g., a flash translation layer (FTL)) on the memory controller 110.

In some example embodiments, the processor 112 may execute various kinds of programs, applications, or firmware. For example, when the uncorrectable error (e.g., any uncorrectable error, at least one uncorrectable error, etc.) is included in the data received from the nonvolatile memory device 120 (e.g., in response to a determination that an uncorrectable error is included in data received from the nonvolatile memory device 120), the processor 112 may execute the firmware for processing the uncorrectable error. However, the present inventive concepts are not limited thereto.

Figure 5:
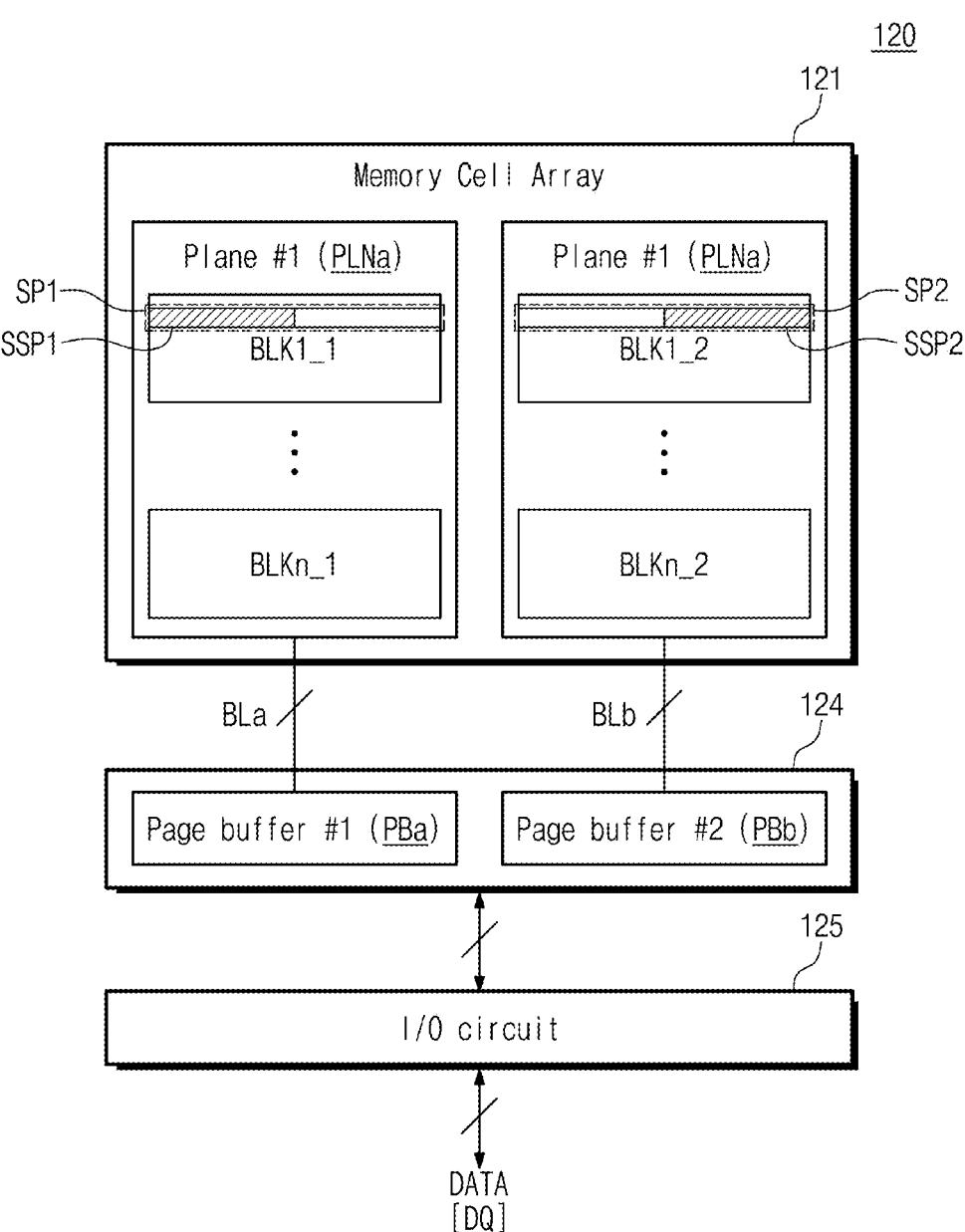
FIG. 5 is a block diagram illustrating a nonvolatile memory device of FIG. 1 performing an interleaving read operation.

FIG. 5 is a block diagram illustrating a nonvolatile memory device of FIG. 1 performing an interleaving read operation. Referring to FIGS. 1 to 5, the nonvolatile memory device 120 may include the first and second planes PLNa and PLNb. The detailed configuration of the nonvolatile memory device 120 is similar to that described with reference to FIGS. 1 to 3, and thus, additional description will be omitted to avoid redundancy.

Each of the first and second planes PLNa and PLNb may include a plurality of memory blocks. For example, the first plane PLNa may include first memory blocks BLK1_1 to BLKn_1, and the second plane PLNb may include second memory blocks BLK1_2 to BLKn_2, where "n" may be any positive integer. Each of the first memory blocks BLK1_1 to BLKn_1 and the second memory blocks BLK1_2 to BLKn_2 may include a plurality of pages.

The nonvolatile memory device 120 may perform the interleaving read operation on the first and second planes PLNa and PLNb. For example, in response to the first read command, the nonvolatile memory device 120 may perform the read operation on a first selection page SP1 included in the memory block BLK1_1. In this case, the data of the first selection page SP1 may be stored in the first page buffer PBa.

As in the above description, in response to the second read command, the nonvolatile memory device 120 may perform the read operation on a second selection page SP2 included in the memory block BLK1_2. In this case, the data of the second selection page SP2 may be stored in the second page buffer PBb.

For brief description, an example in which each of the first and second selection pages SP1 and SP2 is included in the first memory block of each plane is illustrated in FIG. 5, but the present inventive concepts are not limited thereto.

In some example embodiments, the first selection page SP1 may be determined based on the address included in the command sequence of the first read command. The second selection page SP2 may be determined based on the address included in the command sequence of the second read command.

The memory controller 110 may check the status of each of the first and second planes PLNa and PLNb. For example, the memory controller 110 may issue (e.g., transmit) the status read command for each of the first and second planes PLNa and PLNb.

The nonvolatile memory device 120 may return (e.g., transmit to the memory controller 110) the status information of the first plane PLNa or the second plane PLNb in response to the received status read command. For example, the nonvolatile memory device 120 may return the status information of the first plane PLNa or the second plane PLNb to the memory controller 110 through one of the plurality of data pins DQ. In this case, the status information returned to the memory controller 110 may indicate the busy state or the ready state.

In response to the received status information (e.g., in response to processing the status information to determine that the status information indicates that the first and second planes PLNa and PLNb are in the ready state), the memory controller 110 may transmit the memory access commands for the first and second planes PLNa and PLNb to the nonvolatile memory device 120. For example, when the returned status information of the first plane PLNa indicates the "ready state", the memory controller 110 may issue the memory access command for the first plane PLNa.

An address of data that the memory controller 110 intends to receive may be included in the command sequence of the memory access command that the memory controller 110 transmits to the first plane PLNa. For example, information (e.g., a column address) about the address of a first sub-selection page SSP1 may be included in the command sequence of the memory access command transmitted to the first plane PLNa. In this case, the first plane PLNa may return (e.g., transmit) data corresponding to the first sub-selection page SSP1 from among the data stored in the first page buffer PBa to the memory controller 110. As in the above description, the second plane PLNb may return information corresponding to a second sub-selection page SSP2 to the memory controller 110.

In some example embodiments, the data of the first sub-selection page SSP1 that the nonvolatile memory device 120 outputs (e.g., transmits) to the memory controller 110 may be referred to as "first read data", and the data of the second sub-selection page SSP2 that the nonvolatile memory device 120 outputs to the memory controller 110 may be referred to as "second read data".

In some example embodiments, the capacity of the first and second sub-selection pages SSP1 and SSP2 may be half the capacity of the first and second selection pages SP1 and SP2. However, the present inventive concepts are not limited thereto.

In some example embodiments, while the first read data are output (e.g., concurrently with the first read data being transmitted from the nonvolatile memory device 120 to the memory controller 110), the read operation of the second plane PLNb may be completed. For example, while the first read data are output through the plurality of data pins DQ, the data of the second selection page SP2 may be stored in the second page buffer PBb. In this case, even though the memory controller 110 skips the issuing of the status read command for the second plane PLNb, the second read data that do not include an uncorrectable error (e.g., does not include any uncorrectable error) may be read from the nonvolatile memory device 120, thereby improving the speed of the read operation performed by the storage device 100 to read data from at least the second plane PLNb.

Figure 6:
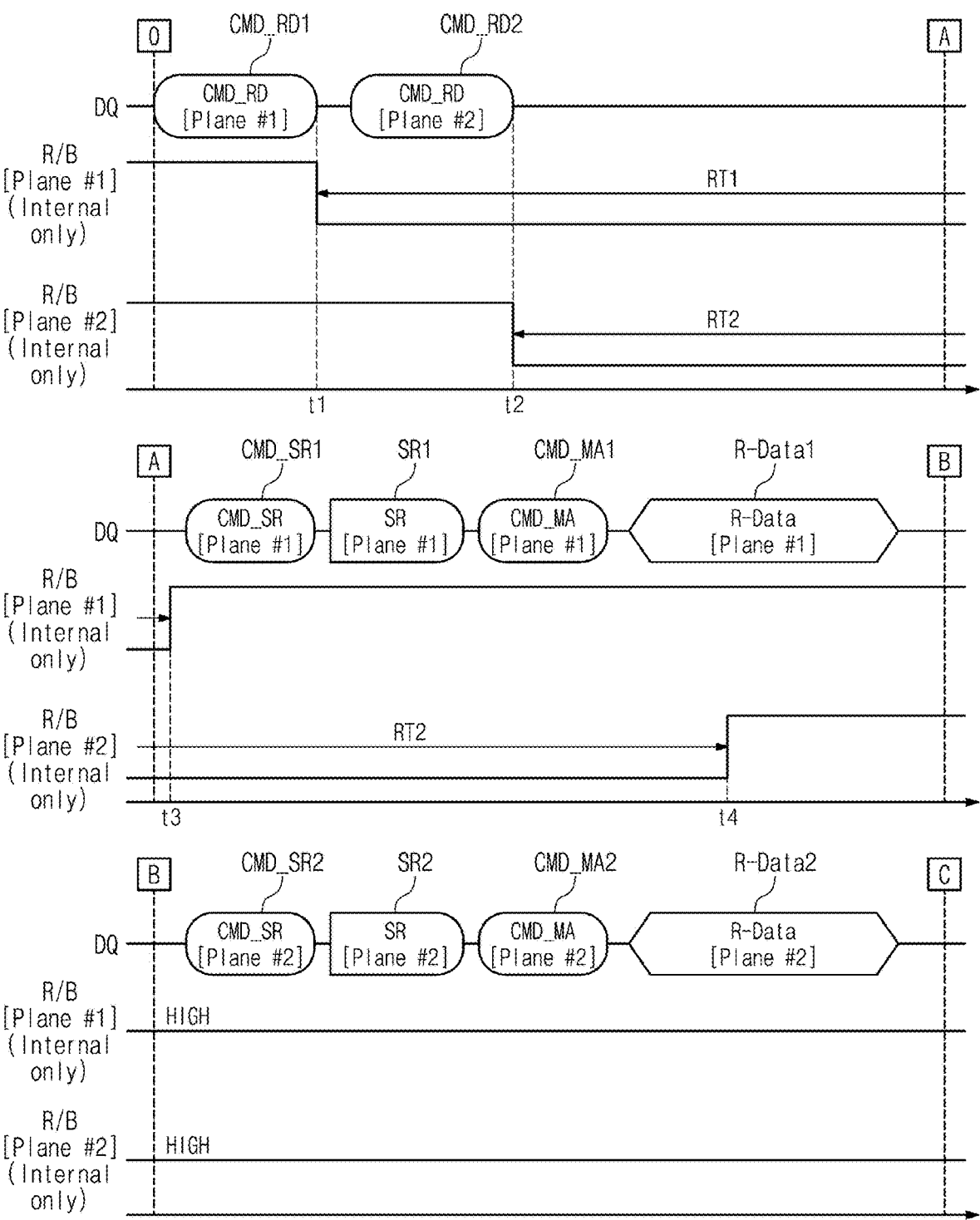
FIG. 6 is a timing diagram illustrating an operation in which a memory controller and a nonvolatile memory device of FIG. 1 perform an interleaving read operation.

FIG. 6 is a timing diagram illustrating an operation in which a memory controller and a nonvolatile memory device of FIG. 1 perform an interleaving read operation.

In the time period from the point in time "0" to the point in time "A", the memory controller 110 may sequentially transmit first and second read commands CMD_RD1 and CMD_RD2 to the nonvolatile memory device 120 (e.g., initially transmit the first read command CMD_RD1 and transmit the second read command CMD_RD2 subsequent to completion of the transmission of the first read command CMD_RD1). The first and second read commands CMD_RD1 and CMD_RD2 may respectively correspond to the first and second planes PLNa and PLNb. For example, the command sequences of the first and second read commands CMD_RD1 and CMD_RD2 may respectively include the addresses of the first and second planes PLNa and PLNb.

The nonvolatile memory device 120 may perform the read operation on the first plane PLNa in response to the first read command CMD_RD1. For example, from the first point in time t1 when the first read command CMD_RD1 is received to the third point in time t3, the nonvolatile memory device 120 may read the data stored in the first plane PLNa so as to be stored in the first page buffer PBa. In some example embodiments, the first point in time t1 when the first read command CMD_RD1 is received at the nonvolatile storage device 120 may be considered to also be the point in time when the first read command CMD_RD1 is transmitted from the memory controller 110 to the nonvolatile storage device 120. In this case, the time period from t1 to t3 may be referred to as a "first read time RT1" associated with the first plane PLNa. That is, the first read time RT1 may refer to a time taken for the nonvolatile memory device 120 to read the data stored in the first page buffer PBa so as to be stored in the first page buffer PBa.

As in the above description, during the time period from the second point in time t2 to the fourth point in time t4, the nonvolatile memory device 120 may perform the read operation on the second plane PLNb in response to the second read command CMD_RD2. In this case, the time period from t2 to t4 may be referred to as a "second read time RT2". In some example embodiments, the second point in time t2 when the second read command CMD_RD2 is received at the nonvolatile storage device 120 may be considered to also be the point in time when the second read command CMD_RD2 is transmitted from the memory controller 110 to the nonvolatile storage device 120.

In some example embodiments, the first plane PLNa may be in the busy state during the first read time RT1. In the case of being out of the first read time RT1 (e.g., after the nonvolatile memory device 120 completes performing the read operation on the first plane PLNa at the third point in time t3), the first plane PLNa may be in the ready state. The second plane PLNb may be in the busy state during the second read time RT2. In the case of being out of the second read time RT2 (e.g., after the nonvolatile memory device 120 completes performing the read operation on the second plane PLNb at the fourth point in time t4), the second plane PLNb may be in the ready state.

In some example embodiments, the status of the first plane PLNa is expressed by the logic level of a first plane internal R/B signal R/B [Plane #1]. For example, when the first plane PLNa is in the busy state, the first plane internal R/B signal R/B [Plane #1] may be at a logic low level; when the first plane PLNa is in the ready state, the first plane internal R/B signal R/B [Plane #1] may be at a logic high level. That is, the first plane internal R/B signal R/B [Plane #1] may indicate the status of the first plane PLNa. As in the above description, a second plane internal R/B signal R/B [Plane #2] may indicate the status of the second plane PLNb.

In some example embodiments, the first plane internal R/B signal R/B [Plane #1] and the second plane internal R/B signal R/B [Plane #2] may not be provided to the memory controller 110. For example, the first plane internal R/B signal R/B [Plane #1] and the second plane internal R/B signal R/B [Plane #2] may be signals that are used only within the nonvolatile memory device 120. Accordingly, the memory controller 110 may fail to directly check the status of each of the first and second planes PLNa and PLNb. In this case, for a faster read operation (e.g., to output data of a plane being in the ready state from the nonvolatile memory device 120 as possible as fast), the memory controller 110 may issue the status read command for the first plane PLNa and the status read command for the second plane PLNb.

In the time period from the point in time "A" to the point in time "B", the memory controller 110 may read first read data R-Data1 corresponding to the first plane PLNa by issuing follow-up commands associated with the first read command CMD_RD1. For example, the memory controller 110 may issue a first status read command CMD_SR1 for the first plane PLNa. The nonvolatile memory device 120 may return first status information SR1 about the first plane PLNa to the memory controller 110 in response to the first status read command CMD_SR1. The memory controller 110 may issue a first memory access command CMD_MA1 for the first plane PLNa based on the first status information SR1. The first plane PLNa may output the first read data R-Data1 to the memory controller 110 through the plurality of data pins DQ in response to the first memory access command CMD_MA1.

In some example embodiments, the follow-up commands associated with the first read command CMD_RD1 may refer to commands corresponding to the same plane as the first read command CMD_RD1. For example, the follow-up commands associated with the first read command CMD_RD1 may refer to the first status read command CMD_SR1 and the first memory access command CMD_MA1.

In some example embodiments, when the first status read command CMD_SR1 is received after the first read time RT1, the first status information SR1 may indicate the ready state. When the first status read command CMD_SR1 is received within the first read time RT1, the first status information SR1 may indicate the busy state. In this case (e.g., in response to a determination that the first status information SR1 indicates the busy state), the memory controller 110 may retransmit the first status read command CMD_SR1 until the status information indicating the ready state is received.

In the time period from the point in time "B" to the point in time "C", the memory controller 110 may read second read data R-Data2 corresponding to the second plane PLNb from the nonvolatile memory device 120 by issuing follow-up commands associated with the second read command CMD_RD2. For example, the memory controller 110 may issue a second status read command CMD_SR2 for the second plane PLNb. The nonvolatile memory device 120 may return second status information SR2 about the second plane PLNb to the memory controller 110 in response to the second status read command CMD_SR2. The memory controller 110 may issue a second memory access command CMD_MA2 for the second plane PLNb based on the second status information SR2. The second plane PLNb may output the second read data R-Data2 to the memory controller 110 through the plurality of data pins DQ in response to the second memory access command CMD_MA2.

In some example embodiments, a time taken to output the first read data R-Data1 to the memory controller 110 through the plurality of data pins DQ may be sufficiently longer than (e.g., equal to or greater than) the second read time RT2. In this case, even though the memory controller 110 does not issue the second status read command CMD_SR2, the memory controller 110 may predict that the second plane PLNb is in the ready state. That is, the memory controller 110 may skip the issuing of the second status read command CMD_SR2 and may issue the second memory access command CMD_MA2 without having received and processed the second status information SR2 to determine that the second plane PLNb is in the ready state. Some example embodiments in which the memory controller 110 skips the issuing of the second status read command CMD_SR2 will be described in detail with reference to the following drawings.

Figure 7:
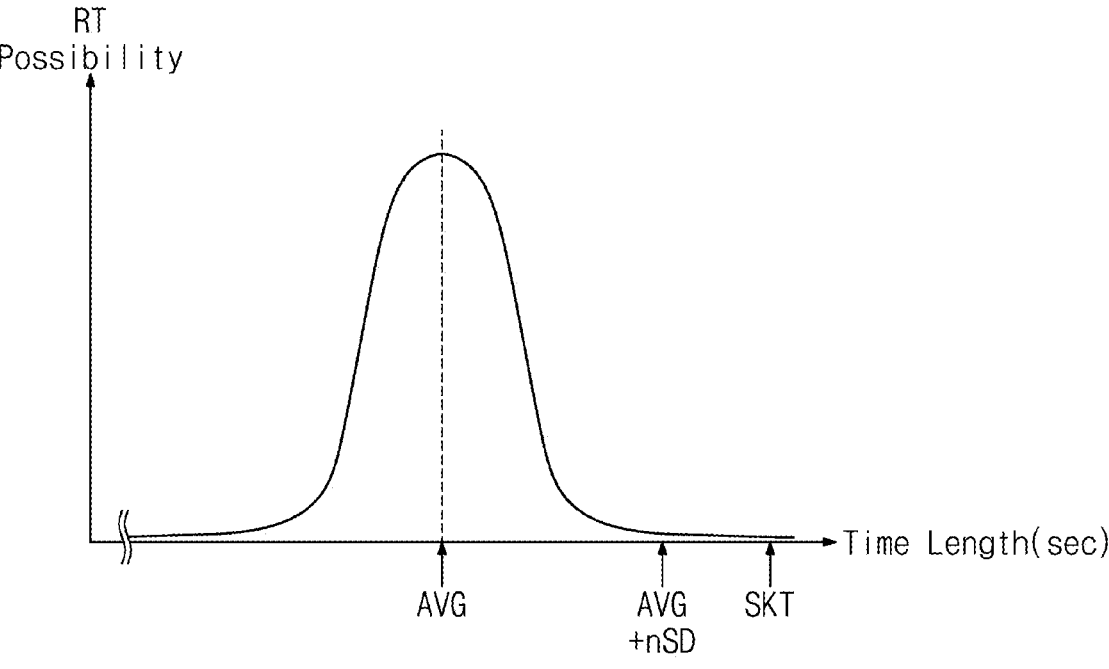
FIG. 7 is a diagram illustrating a probability distribution associated with time lengths of first and second read times of FIG. 6.

FIG. 7 is a diagram illustrating a probability distribution associated with time lengths of first and second read times RT1 and RT2 of FIG. 6. In FIG. 7, a horizontal axis represents a time length (e.g., a duration of time elapsed after a read command is transmitted from the memory controller 110), and a vertical axis represents a probability (e.g., a probability that the reading of data from a plane in response to the read command is completed). For brief description, below, the first and second read times RT1 and RT2 may be referred to as a "read time RT". However, the present inventive concepts are not limited thereto. For example, the read time RT may refer to a time taken to perform the read operation of an arbitrary page in the nonvolatile memory device 120 (e.g., the duration of time elapsed after a read command is transmitted from the memory controller 110 at which the read operation of a page in response to the read command is completed).

Referring to FIGS. 6 and 7, the read time RT may have a probability distribution of a normal distribution form. For example, the read time RT may have the probability distribution of the normal distribution form in which an average is "AVG" and a standard deviation is "SD". In this case, the probability that the length (e.g., magnitude, amount, etc.) of the read time RT has a value similar to "AVG" may be high, and the probability that the length of the read time RT has a great difference with "AVG" may be low.

As a magnitude of "n" increases, the probability that the read time RT is "AVG+n*SD" may decrease. For example, the probability that the read time RT is "AVG+5SD" (i.e., when n is 5) may be about 1 in 7 million. That is, when the time of "AVG+5SD" passes after the memory controller 110 issues the second read command CMD_RD2, the probability that the second plane PLNb is in the busy state may be about 1 in 7 million.

The length of the skip time SKT may be sufficiently longer than "AVG". For example, the skip time SKT may be longer than "AVG" as much as "5SD" or more. Accordingly, when the skip time SKT passes after the memory controller 110 issues the second read command CMD_RD2, the probability that the second plane PLNb is in the busy state may be very low. In this case, without checking the status of the second plane PLNb (i.e., as the memory controller 110 may predict, or determine, that the second plane PLNb is in the ready state), the memory controller 110 may read the data corresponding to the second plane PLNb from the nonvolatile memory device 120 without having received and processed second status information SR2 indicating that the second plane PLNb is in the ready state, and thus without having determined that the second plane PLNb is in the ready state based on processing second status information SR2 for the second plane PLNb. In detail, the memory controller 110 may skip the issuing (e.g., transmitting) of the second status read command CMD_SR2 being the follow-up command of the second read command CMD_RD2 and may issue the second memory access command CMD_MA2.

In some example embodiments, when there are skipped the operation in which the memory controller 110 issues the second status read command CMD_SR2 and the operation in which the nonvolatile memory device 120 returns the second status information SR2, the read speed for the nonvolatile memory device 120 may be improved, and thus the operational speed and operational performance of the storage device 100 and any electronic device, computing device, or the like including same may be improved, and the power consumption by the storage device 100 and any electronic device, computing device, or the like including same may be reduced based on skipping such operations to perform a read operation to read second read data R-Data2. Some example embodiments in which the memory controller 110 skips the issuing of the second status read command CMD_SR2 based on the skip time SKT will be described in detail with reference to FIGS. 7 to 12.

Figure 8:
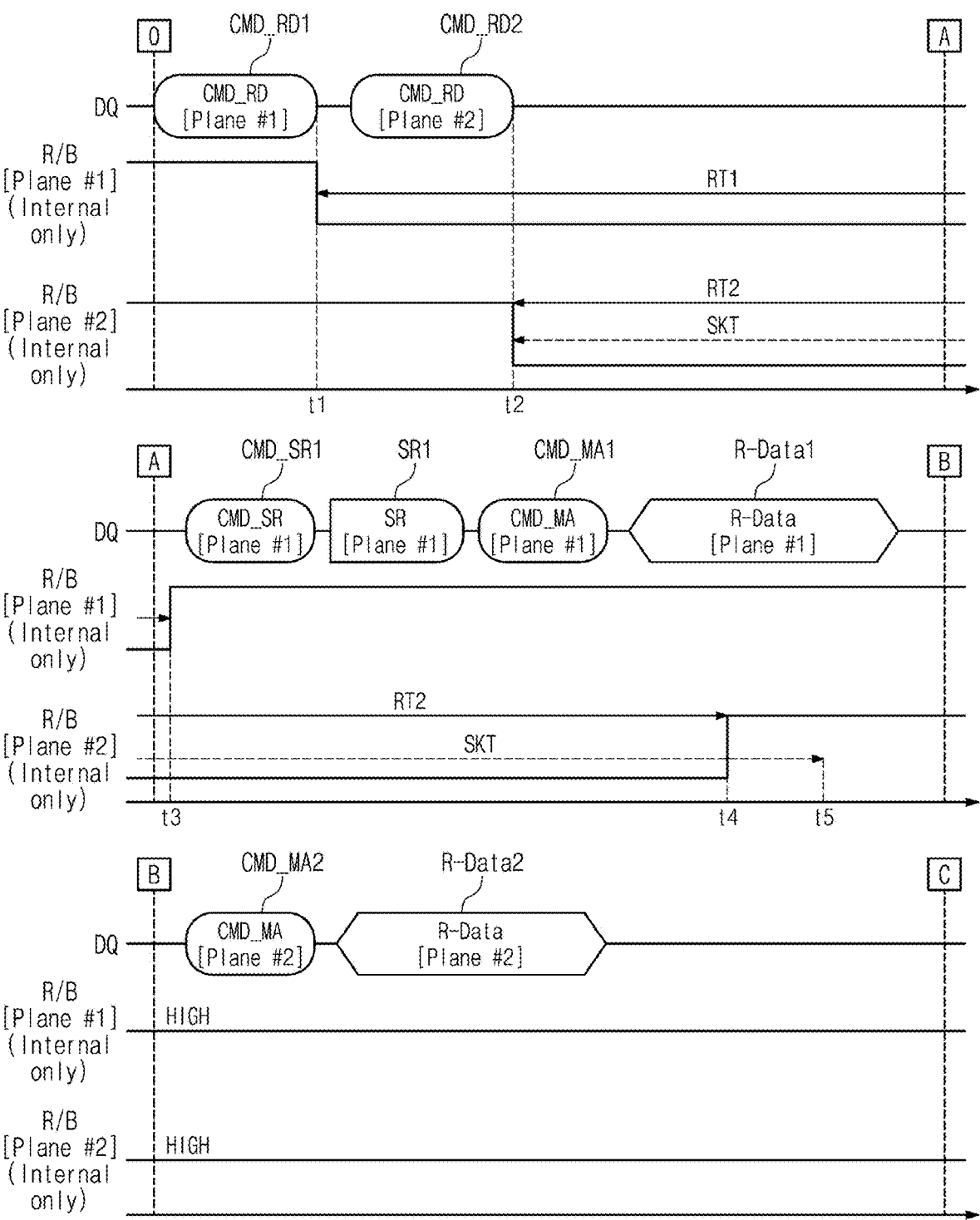
FIG. 8 is a timing diagram illustrating an operation in which a memory controller and a nonvolatile memory device of FIG. 1 skip the issuing of a status read command based on a skip time.

FIG. 8 is a timing diagram illustrating an operation in which a memory controller and a nonvolatile memory device of FIG. 1 skip the issuing of a status read command based on a skip time. Referring to FIGS. 1 to 8, in the time period from the point in time "O" to the point in time "A", the memory controller 110 may sequentially transmit the first and second read commands CMD_RD1 and CMD_RD2 to the nonvolatile memory device 120. In the time period from the point in time "A" to the point in time "B", the memory controller 110 may read the first read data R-Data1 corresponding to the first plane PLNa by issuing follow-up commands associated with the first read command CMD_RD1. Operations that the memory controller 110 and the nonvolatile memory device 120 perform in the time period from the point in time "A" to the point in time "B" are similar to those described with reference to FIG. 6, and thus, additional description will be omitted to avoid redundancy.

The fifth point in time t5 may refer to a point in time when the skip time SKT passes from the second point in time t2 (e.g., the magnitude of the skip time SKT after the second point in time t2 at which the second read command CMD_RD2 is transmitted). In this case, as described with reference to FIG. 7, the skip time SKT may be set to be longer than the average of the probability distribution of the second read time RT2 (e.g., at least two standard deviations after the average second read time RT2 in a normalized probability distribution, at least five standard deviations after the average second read time RT2 in a normalized probability distribution, etc.).

In some example embodiments, a time taken to output the first read data R-Data1 to the memory controller 110 through the plurality of data pins DQ may be longer than a time taken to exchange any other information (e.g., other commands or status information) through the plurality of data pins DQ. For example, a time taken to output the first read data R-Data1 to the memory controller 110 through the plurality of data pins DQ may be longer than the skip time SKT. In this case, the fifth point in time t5 may be included in the time period where the first read data R-Data1 are output to the memory controller 110 through the plurality of data pins DQ.

In the time period from the point in time "B" to the point in time "C", the memory controller 110 may read the second read data R-Data2 corresponding to the second plane PLNb by issuing follow-up commands associated with the second read command CMD_RD2.

Because the point in time "B" is after the skip time SKT passes from the second point in time t2 when the second read command CMD_RD2 is issued (i.e., is after the fifth point in time t5), at the point in time "B", the second plane PLNb may have the ready state with the high probability.

Accordingly, even though the memory controller 110 does not issue the second status read command CMD_SR2 (and thus does not receive and process second status information SR2 to determine that the second status information SR2 indicates that the second plane PLNb is in the ready state and transmit the second memory access command CMD_MA2 based on such determination), the memory controller 110 may predict (e.g., determine) that the second plane PLNb is in the ready state based on the elapsed time (e.g., measured time) since the second read command CMD_RD2 was transmitted at the second point in time t2 being determined to be equal to or greater than the skip time SKT. That is, the memory controller 110 may skip the issuing of the second status read command CMD_SR2. In this case, the memory controller 110 may output the second memory access command CMD_MA2 to the nonvolatile memory device 120. In some example embodiments, the memory controller 110 may output the second memory access command CMD_MA2 to the nonvolatile memory device 120 without having determined that the second plane PLNb is in the ready state in response to processing second status information SR2 received from the nonvolatile memory device 120, where the memory controller 110 may output the second memory access command CMD_MA2 to the nonvolatile memory device 120 instead based on a determination that at least the skip time SKT has elapsed since the second point in time t2 at which the second read commend CMD_RD2 is transmitted to the nonvolatile memory device 120. In some example embodiments, the memory controller 110 may output the second memory access command CMD_MA2 to the nonvolatile memory device 120 in response to both a determination that the first read data R-Data1 is received and/or based on the determination that at least the skip time SKT has elapsed since the second point in time t2 at which the second read commend CMD_RD2 is transmitted to the nonvolatile memory device 120.

In some example embodiments, when the issuing of the second status read command CMD_SR2 is skipped, the length of the time period from the point in time "B" to the point in time "C" may decrease, thereby improving the operating speed of the storage device 100 to perform the read operation. For example, the length of the time period from the point in time "B" to the point in time "C" may be shorter than the length of the time period from the point in time "A" to the point in time "B".

In some example embodiments, how the memory controller 110 determines to skip the issuing of the second status read command CMD_SR2 based on the skip time SKT will be described in detail with reference to FIGS. 9 and 10.

The nonvolatile memory device 120 may output the second read data R-Data2 in response to the second memory access command CMD_MA2. In this case, whether the second read data R-Data2 includes an uncorrectable error (e.g., any uncorrectable error, at least one uncorrectable error, etc.) may be determined based on lengths of the skip time SKT and the second read time RT2.

For example, when the skip time SKT is longer than the second read time RT2, the nonvolatile memory device 120 may output the second read data R-Data2 from the second page buffer PBb after the data of the second plane PLNb are completely stored in the second page buffer PBb. In this case, the second read data R-Data2 may not include an uncorrectable error (e.g., may not include any uncorrectable error). Some example embodiments in which the skip time SKT is longer than the second read time RT2 will be described in detail with reference to FIG. 11.

In contrast, when the skip time SKT is shorter than the second read time RT2, the nonvolatile memory device 120 may output the second read data R-Data2 from the second page buffer PBb before the data of the second plane PLNb are completely stored in the second page buffer PBb. In this case, the second read data R-Data2 may include an uncorrectable error (e.g., any uncorrectable error, at least one uncorrectable error, etc.). Some example embodiments in which the skip time SKT is shorter than the second read time RT2 will be described in detail with reference to FIG. 12.

Figure 9:
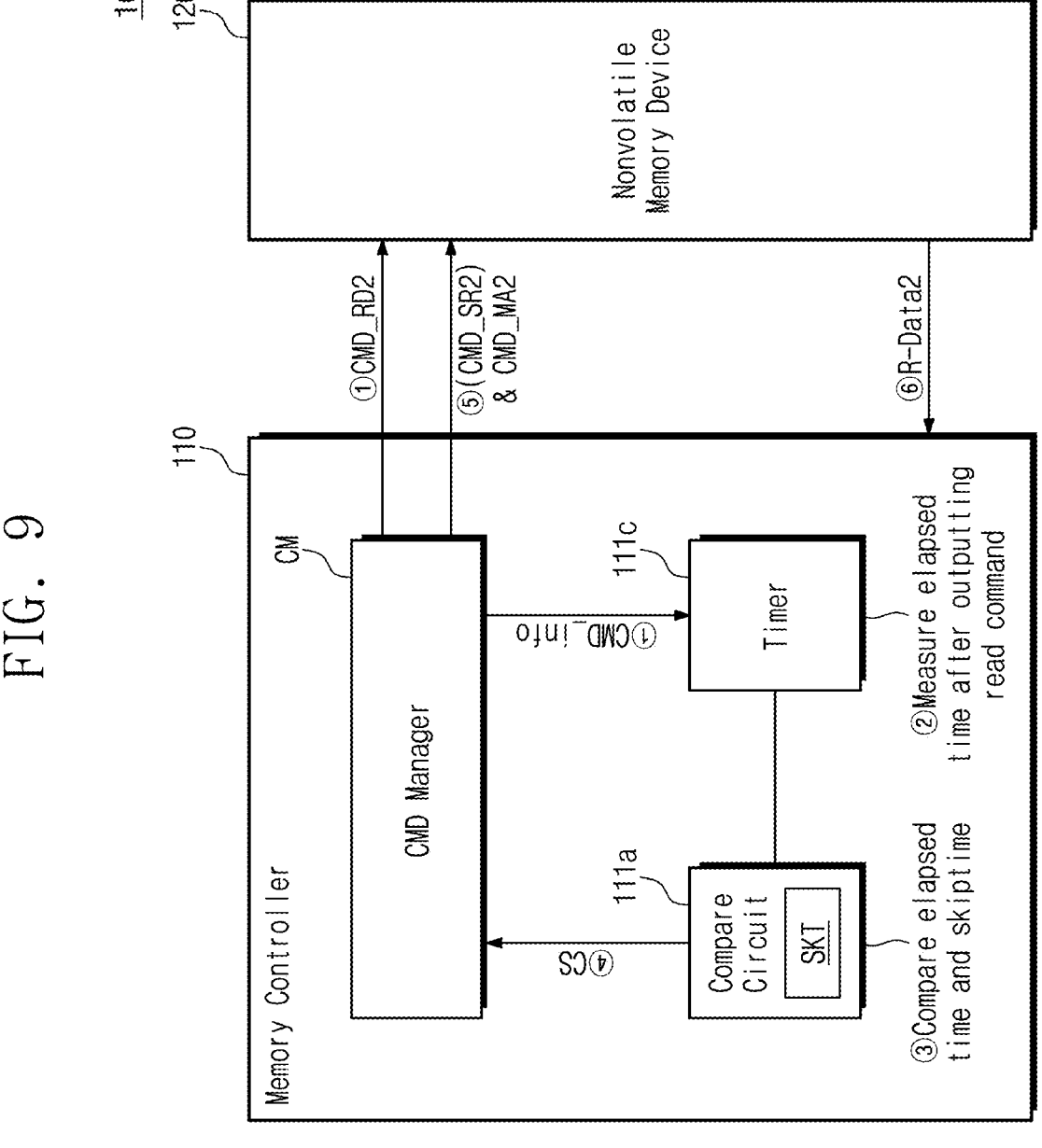
FIG. 9 is a diagram illustrating an operation of a memory controller according to some example embodiments of the present inventive concepts in detail.

FIG. 9 is a diagram illustrating an operation of a memory controller according to some example embodiments of the present inventive concepts in detail. Below, an operation in which the memory controller 110 determines whether to skip the second status read command CMD_SR2 of FIG. 6 based on the skip time SKT will be described in detail.

Referring to FIGS. 1 and 4 to 9, the command manager CM may transmit the second read command CMD_RD2 to the nonvolatile memory device 120 (①). Also (e.g., simultaneously or near simultaneously with transmitting the second read command CMD_RD2), the command manager CM may provide the timer 111c with information CMD_info indicating that the second read command CMD_RD2 is transmitted (①).

The timer 111c may receive the information CMD_info indicating that the second read command CMD_RD2 is transmitted. The timer 111c may measure an elapsed time from a point in time when the information CMD_info is received (②), which may be determined to be the same as or to correspond to a point in time when the second read command CMD_RD2 is transmitted.

The compare circuit 111a may compare the elapsed time measured through the timer 111c and the skip time SKT (③). The compare circuit 111a may generate a control signal CS based on the comparison result. The compare circuit 111a may provide the control signal CS to the command manager CM (④).

In some example embodiments, the logic level of the control signal CS may be determined based on lengths of the elapsed time and the skip time SKT. For example, when the elapsed time is longer than the skip time SKT, the control signal CS may have a first logic level. In contrast, when the elapsed time is shorter than the skip time SKT, the control signal CS may have a second logic level.

The command manager CM may issue a follow-up command of the second read command CMD_RD2 based on the control signal CS (⑤). For example, in response to the control signal CS having the first logic level, the command manager CM may skip the issuing of the second status read command CMD_SR2 and may transmit the second memory access command CMD_MA2 to the nonvolatile memory device 120. In this case, the nonvolatile memory device 120 may output the second read data R-Data2 in response to the second memory access command CMD_MA2 (⑥).

In contrast, when the control signal CS has the second logic level, the command manager CM may provide (e.g., transmit) the second status read command CMD_SR2 to the nonvolatile memory device 120. In this case, the command manager CM may transmit the second memory access command CMD_MA2 to the nonvolatile memory device 120 in response to that status information indicating the ready state is returned from the nonvolatile memory device 120. Afterwards, the nonvolatile memory device 120 may output the second read data R-Data2 in response to the second memory access command CMD_MA2.

For brief description, some example embodiments in which the issuing of the second status read command CMD_SR2 is skipped is described representatively with reference to FIG. 9. However, the present inventive concepts are not limited thereto. For example, the memory controller 110 may be further configured to skip the issuing of the first status read command CMD_SR1 based on the skip time SKT and the elapsed time from a point in time when the first read command CMD_RD1 is issued.

Figure 10:
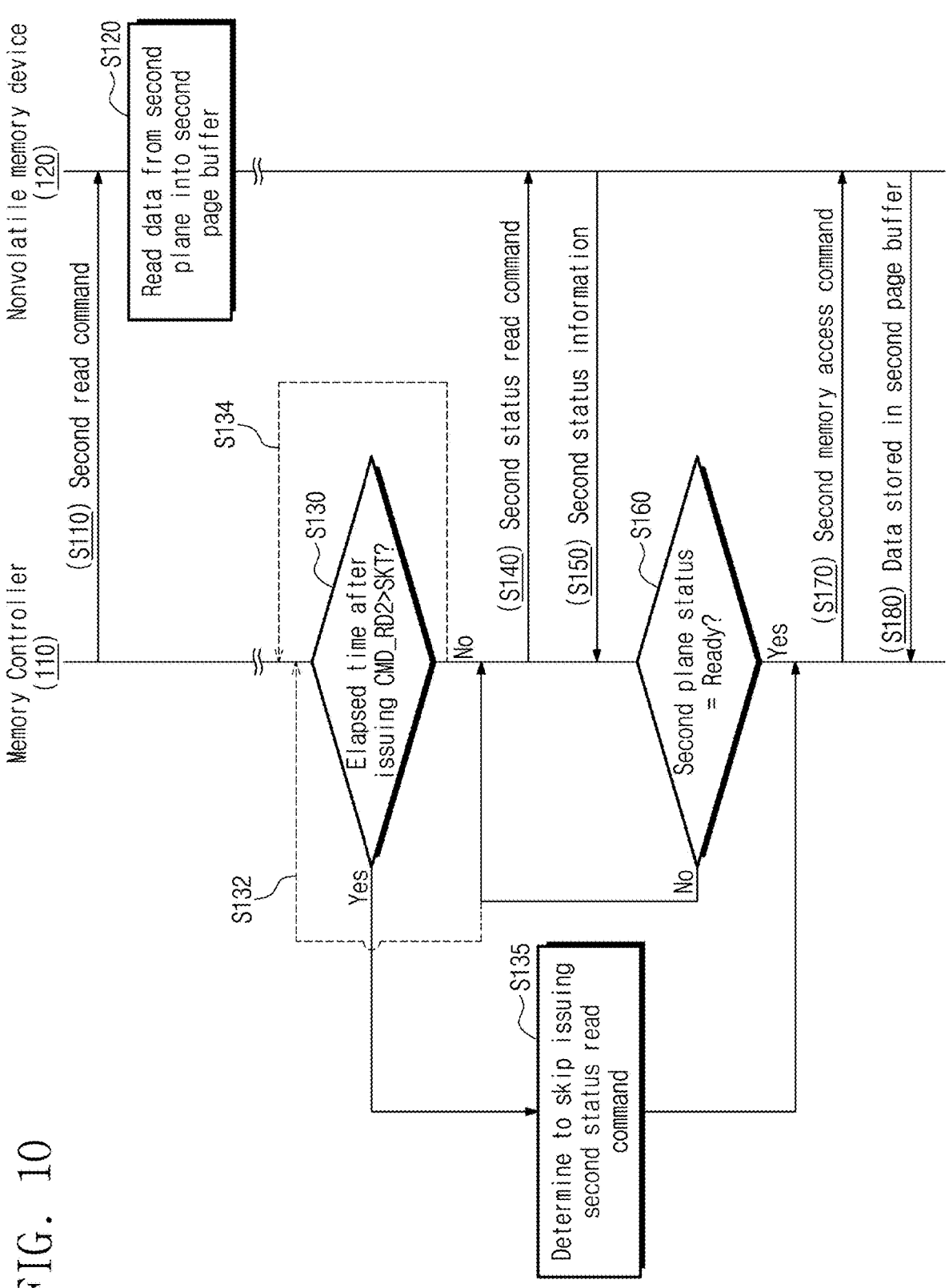
FIG. 10 is a flowchart illustrating an operation of a storage device of FIG. 9.

FIG. 10 is a flowchart illustrating an operation of a storage device of FIG. 9. Referring to FIGS. 1 and 4 to 10, in operation S110, the memory controller 110 may transmit the second read command CMD_RD2 for the second plane PLNb to the nonvolatile memory device 120. In this case, the second read command CMD_RD2 may include the address of the second plane PLNb.

In operation S120, the nonvolatile memory device 120 may read data (e.g., data corresponding to the second selection page SP2) from the second plane PLNb and may store the read data in the second page buffer PBb.

In operation S130, the memory controller 110 may compare the elapsed time from the point in time when the second read command CMD_RD2 is issued, with the skip time SKT. For example, the compare circuit 111a may compare the elapsed time measured by the timer 111c with the skip time SKT.

When (e.g., in response to a determination that) the elapsed time is shorter than the skip time SKT, operation S140 may be performed. When (e.g., in response to a determination that) the elapsed time is longer than the skip time SKT, operation S135 may be performed.

In some example embodiments, in the case where the memory controller 110 is configured to skip the issuing of the status read commands for the first and second planes PLNa and PLNb according to the elapsed time based on the skip time, the memory controller 110 may be referred to as applying the skip time to the nonvolatile memory device 120.

In operation S135, the memory controller 110 may determine to skip the issuing the second status read command CMD_SR2. For example, when a time that is the skip time SKT or more passes after the command manager CM issues the second read command CMD_RD2 (e.g., in response to a determination that the duration of time elapsed after the command manager CM issues the second read command CMD_RD2 is equal to or greater than the skip time SKT), the compare circuit 111a may determine to skip the issuing of the second read command CMD_RD2. That is, in this case, operation S140 to operation S160 may be skipped, and operation S170 may be performed.

In operation S140, the memory controller 110 may transmit the second status read command CMD_SR2 for the second plane PLNb to the nonvolatile memory device 120.

In operation S150, the nonvolatile memory device 120 may return the second status information SR2 about the second plane PLNb. In this case, the second status information SR2 may indicate one of the busy state or the ready state, depending on the status of the second plane PLNb. For example, when the second status read command CMD_SR2 is received within the second read time RT2, the second status information SR2 may indicate the busy state. When the second status read command CMD_SR2 is received after the second read time RT2, the second status information SR2 may indicate the ready state.

In operation S160, the memory controller 110 may determine the status information of the second plane PLNb. For example, when the second status information SR2 indicates the ready state, operation S170 may be performed. When the second status information SR2 indicates the busy state, operation S140 and operation S150 may be again performed. In some example embodiments, when the second status information SR2 indicates the busy state at S160, operation S130 is again performed at S132 (e.g., after a particular period of time such as 0.1 ms) instead of directly proceeding to performing operation S140 again as shown in FIG. 10, such that the elapsed time may be compared again with the skip time SKT at S130.

In operation S170, the memory controller 110 may transmit the second memory access command CMD_MA2 for the second plane PLNb to the nonvolatile memory device 120. In this case, the command sequence of the second memory access command CMD_MA2 may include the address of the second plane PLNb.

In operation S180, the nonvolatile memory device 120 may output the data stored in the second page buffer PBb to the memory controller 110.

In some example embodiments, when the elapsed time is shorter than the skip time SKT (e.g., S130=NO), operation S130 is again performed at S134 (e.g., after a particular period of time such as 0.1 ms) instead of directly proceeding to performing operations S140 to S160, such that the elapsed time may be compared again with the skip time SKT at S130.

In some example embodiments, the data transmitted to the memory controller 110 in operation S180 may change depending on whether operation S120 is completed. For example, when operation S120 is completed, the data corresponding to the second read command CMD_RD2 may be present in the second page buffer PBb. In this case, an uncorrectable error (e.g., any uncorrectable error, at least one uncorrectable error, etc.) may not be included in the data transmitted to the memory controller 110 in operation S180. Some example embodiments in which operation S180 is performed after operation S120 is completed will be described in detail with reference to FIG. 11.

In contrast, when operation S120 is not completed, the data corresponding to the second read command CMD_RD2 may be absent from the second page buffer PBb. For example, a part of the second page buffer PBb may be in a value-undefined state. In this case, an uncorrectable error (e.g., any uncorrectable error, at least one uncorrectable error, etc.) may be included in the data transmitted to the memory controller 110 in operation S180. Some example embodiments in which operation S180 is performed before operation S120 is completed will be described in detail with reference to FIG. 12.

Figure 11:
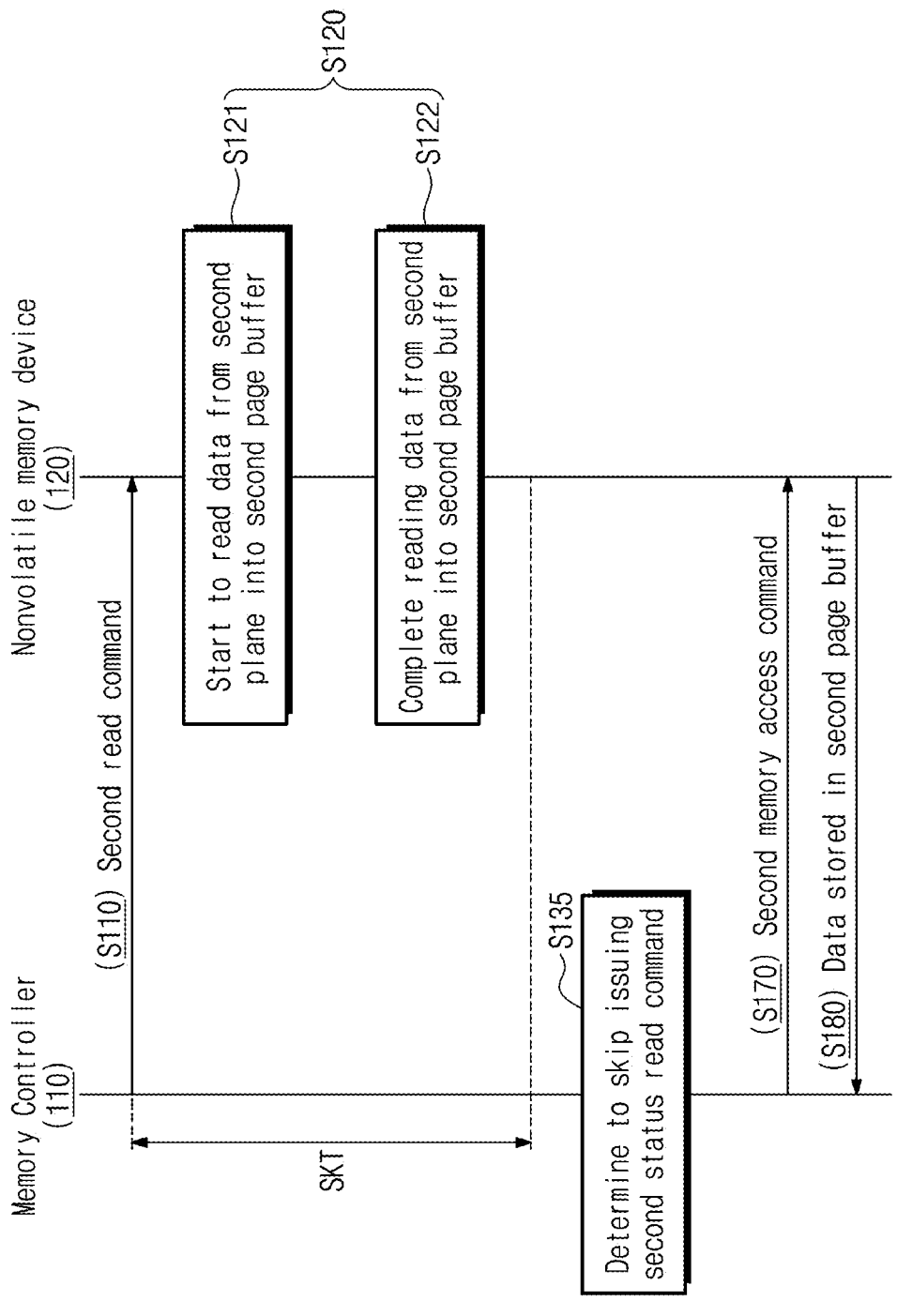
FIG. 11 is a flowchart illustrating some example embodiments where issuing of a status read command is skipped, in detail.

FIG. 11 is a flowchart illustrating some example embodiments of the case where issuing of a status read command is skipped, in detail. Referring to FIGS. 1 and 4 to 11, operation S120 may include operation S121 and operation S122. Operation S110, operation S135, operation S170, and operation S180 are similar to those described with reference to FIG. 10, and thus, additional description will be omitted to avoid redundancy.

In operation S121, the nonvolatile memory device 120 may start the read operation such that the data of the second plane PLNb are stored in the second page buffer PBb. For example, the nonvolatile memory device 120 may read the data stored in the second plane PLNb by inputting various voltages to the second plane PLNb.

In operation S122, the nonvolatile memory device 120 may complete the data read from the second plane PLNb to the second page buffer PBb. For example, the second page buffer PBb may complete the storing of the data read from the second page buffer PBb. In this case, the data (e.g., data of the second selection page SP2) corresponding to the address included in the command sequence of the second read command CMD_RD2 may be stored in the second page buffer PBb.

In some example embodiments, the time period (e.g., duration, elapsed time, etc.) from a point in time when operation S121 is performed to a point in time when operation S122 is performed may correspond to the second read time RT2. That is, referring to FIG. 8, the second read time RT2 may be included in the time period from the second point in time t2 when the second read command CMD_RD2 is transmitted to the fifth point in time t5 when the skip time SKT passes (e.g., the fifth point in time t5 at which the skip time SKT elapses).

In operation S135, the memory controller 110 may determine to skip the issuing the second status read command CMD_SR2 and thus proceed to transmitting the second memory access command CMD_MA2 at S170 without transmitting the second status read command CMD_SR2 and thus without receiving the second status information at S150 and determining that the second plane PLNb is in the ready state (S160=YES), and therefore the second memory access command may be transmitted at S170 without doing so in response to a determination at S160 that the second plane PLNb is in the ready state based on processing received second status information.

In operation S170, the memory controller 110 may transmit the second memory access command CMD_MA2 for the second plane PLNb to the nonvolatile memory device 120.

In operation S180, the nonvolatile memory device 120 may output the data stored in the second page buffer PBb to the memory controller 110. For example, the nonvolatile memory device 120 may output the data completely stored in the second page buffer PBb in operation S122 to the memory controller 110. In this case, an uncorrectable error (e.g., any uncorrectable error, at least one uncorrectable error, etc.) may not be included in the data transmitted to the memory controller 110 in operation S180.

That is, when operation S122 is performed before operation S180, even though the memory controller 110 does not check the status information of the second plane PLNb, the memory controller 110 may receive the read data that do not include the uncorrectable error.

Figure 12:
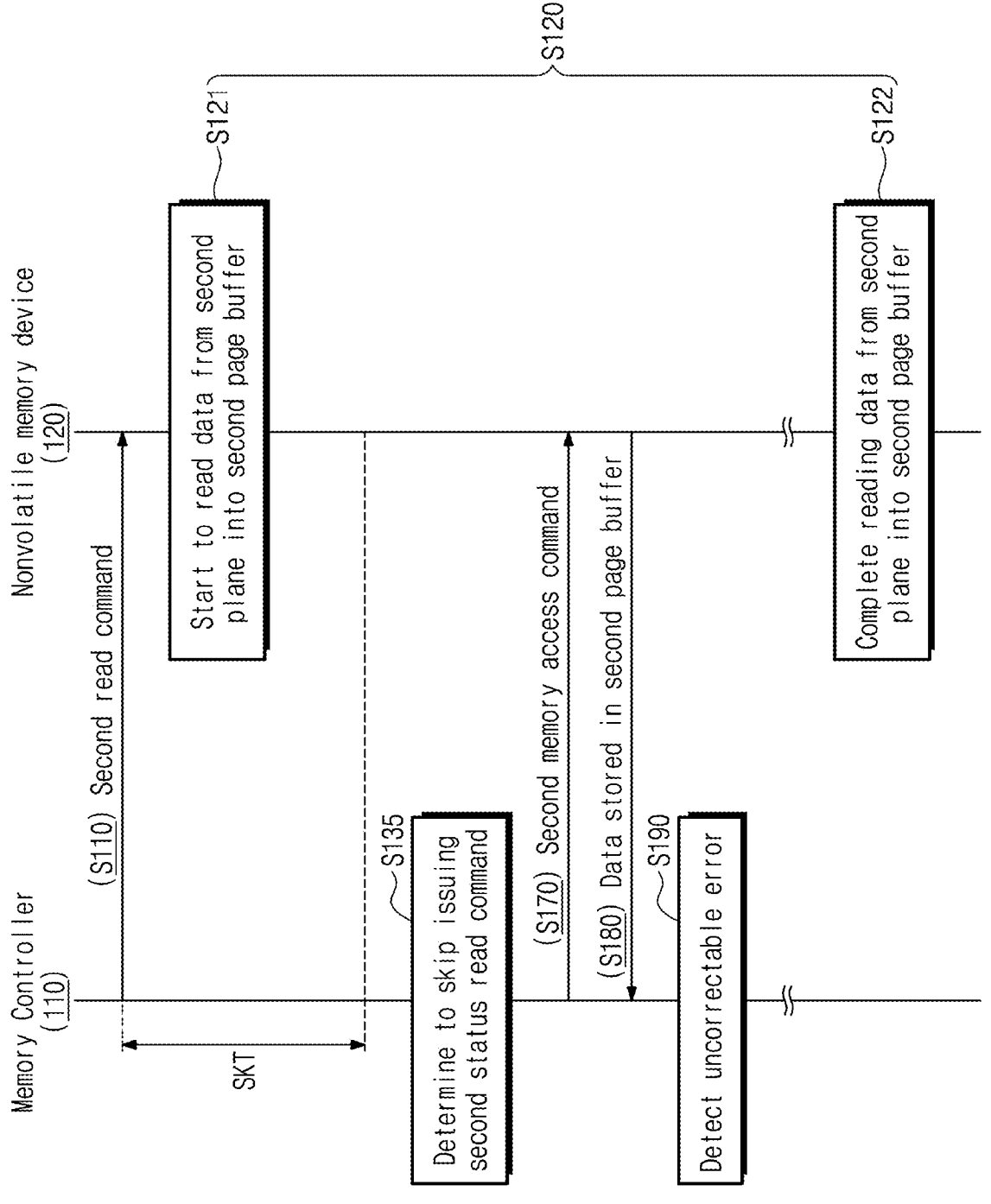
FIG. 12 is a flowchart illustrating some example embodiments where issuing of a status read command is skipped, in detail.

FIG. 12 is a flowchart illustrating some example embodiments of the case where issuing of a status read command is skipped, in detail. Referring to FIGS. 1 and 4 to 12, operation S120 may include operation S121 and operation S122. Operation S1101, operation S121, operation S135, operation S170, and operation S180 are similar to those described with reference to FIG. 11, and thus, a difference with FIG. 11 will be described below.

Continuing to refer to FIG. 12, operation S122 may not be performed within the skip time SKT from a point in time when the memory controller 110 issues the second read command CMD_RD2. For example, operation S122 may be performed after operation S180 is performed. That is, before operation S180 is performed, the data read from the second plane PLNb to the second page buffer PBb may not be completed. In this case, at least a partial region of the second page buffer PBb may be in a value-undefined state. Accordingly, an uncorrectable error (e.g., any uncorrectable error, at least one uncorrectable error, etc.) may be included in the data of the second plane PLNb returned to the memory controller 110 in operation S180.

In some example embodiments, the time period from a point in time when operation S121 is performed to a point in time when operation S122 is performed may correspond to the second read time RT2. That is, referring to FIG. 8 together, the second read time RT2 may not be included in the time period from the second point in time t2 when the second read command CMD_RD2 is transmitted to the fifth point in time t5 when the skip time SKT passes.

In operation S190, the memory controller 110 may detect the uncorrectable error of the data of the second plane PLNb received from the nonvolatile memory device 120. For example, the error correction module 115 may determine that the uncorrectable error is included in the data received in operation S180.

In some example embodiments, when it is determined (e.g., in response to a determination) that the uncorrectable error is included in the received data, the memory controller 110 may dynamically adjust the skip time SKT. Below, some example embodiments in which the memory controller 110 dynamically adjusts the skip time SKT will be described in detail with reference to FIGS. 13 to 15.

Figure 13:
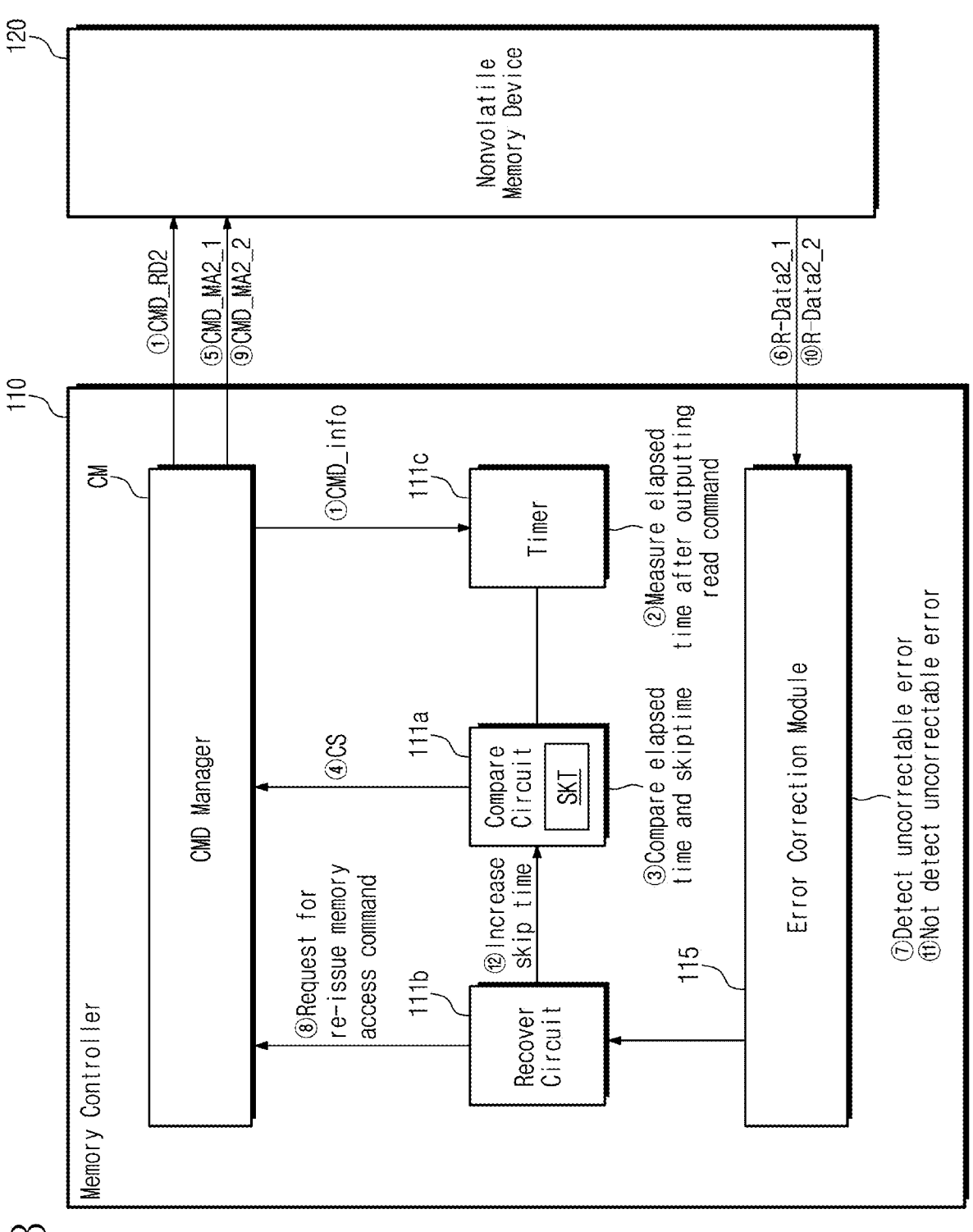
FIG. 13 is a diagram illustrating an operation in which a memory controller dynamically increases a skip time, in detail.

FIG. 13 is a diagram illustrating an operation in which a memory controller dynamically increases a skip time, in detail. Referring to FIGS. 1, 4 to 10, and 13, the command manager CM may transmit the second read command CMD_RD2 to the nonvolatile memory device 120 (①). Afterwards, the status manager 111 may provide the nonvolatile memory device 120 with the control signal CS generated as a result of comparing the elapsed time and the skip time SKT (④). The operations ① to ④ are similar to those described with reference to FIG. 9, and thus, additional description will be omitted to avoid redundancy.

The command manager CM may issue a follow-up command of the second read command CMD_RD2 based on the control signal CS. For example, based on the control signal CS having the first logic level, the command manager CM may skip the issuing of the second status read command CMD_SR2 and may provide a second memory access command CMD_MA2_1 to the nonvolatile memory device 120 (⑤). The nonvolatile memory device 120 may output second read data R-Data2_1 in response to the second memory access command CMD_MA2_1 (⑥).

In some example embodiments, the second memory access command CMD_MA2_1 may refer to a memory access command first issued as the follow-up command of the second read command CMD_RD2.

In some example embodiments, the second read data R-Data2_1 may refer to the read data (⑥) output to the memory controller 110 in a state where the data are not completely stored in the second page buffer PBb. In this case, an uncorrectable error (e.g., any uncorrectable error, at least one uncorrectable error, etc.) may be included in the second read data R-Data2_1. Below, some example embodiments in which the second status read command CMD_SR2 is skipped and the second read time RT2 is not included in the time period from a point in time when the second read command CMD_RD2 is issued to a point in time when the second memory access command CMD_MA2_1 is issued will be described representatively.

The error correction module 115 may detect the uncorrectable error (e.g., any uncorrectable error, at least one uncorrectable error, etc.) from the second read data R-Data2_1 (⑦). For example, the error correction module 115 may determine that some values of the second read data R-Data2_1 are in an undefined state. The error correction module 115 may provide the recover circuit 111b with a notification indicating that the uncorrectable error is detected.

In response to the notification (indicating that the uncorrectable error is detected) from the error correction module 115, the recover circuit 111b may request the command manager CM to re-issue the memory access command (⑧).

In some example embodiments, the recover circuit 111b may count the number of times that there is received the notification indicating that the uncorrectable error is detected. The recover circuit 111b may determine whether to request the command manager CM to re-issue the memory access command, based on a count value. How the recover circuit 111b operates based on the count value will be described in detail with reference to FIG. 14.

The command manager CM may re-issue a follow-up command of the second read command CMD_RD2 in response to the request from the recover circuit 111b. For example, the command manager CM may provide a third memory access command CMD_MA2_2 to the nonvolatile memory device 120 (⑨). The nonvolatile memory device 120 may output third read data R-Data2_2 in response to the third memory access command CMD_MA2_2 (⑩).

In some example embodiments, the configuration of the third memory access command CMD_MA2_2 may be identical to the configuration of the second memory access command CMD_MA2_1.

In some example embodiments, while the operations ⑦ to ⑨ are performed, the data corresponding to the second read command CMD_RD2 may be completely stored in the second page buffer PBb. For example, before the third memory access command CMD_MA2_2 is received, the nonvolatile memory device 120 may completely store the data corresponding to the second selection page SP2 in the second page buffer PBb. In this case, an uncorrectable error (e.g., any uncorrectable error, at least one uncorrectable error, etc.) may not be included in the third read data R-Data2_2.

The error correction module 115 may fail to detect the uncorrectable error (e.g., any uncorrectable error, at least one uncorrectable error, etc.), which may be the same or different uncorrectable error as the uncorrectable error detected from the second read data R-Data2_1, from the third read data R-Data2_2 (⑪). The error correction module 115 may provide the recover circuit 111b with a notification indicating that the uncorrectable error is not detected.

In some example embodiments, when the error correction module 115 detects the uncorrectable error from the third read data R-Data2_2, the operations ⑦ to ⑩ may be repeatedly performed.

The recover circuit 111b may increase the skip time SKT in response to the notification indicating that the uncorrectable error is not detected (⑫).

In some example embodiments, the second read data R-Data2_1 and the third read data R-Data2_2 may correspond to the second read command CMD_RD2. However, unlike the second read data R-Data2_1, the third read data R-Data2_2 may include the uncorrectable error because the skip time SKT is not sufficiently secured (e.g., is not sufficiently increased). Accordingly, when the recover circuit 111b increases the skip time SKT, the probability that the uncorrectable error is included in the data read from the nonvolatile memory device 120 may decrease.

Figure 14:
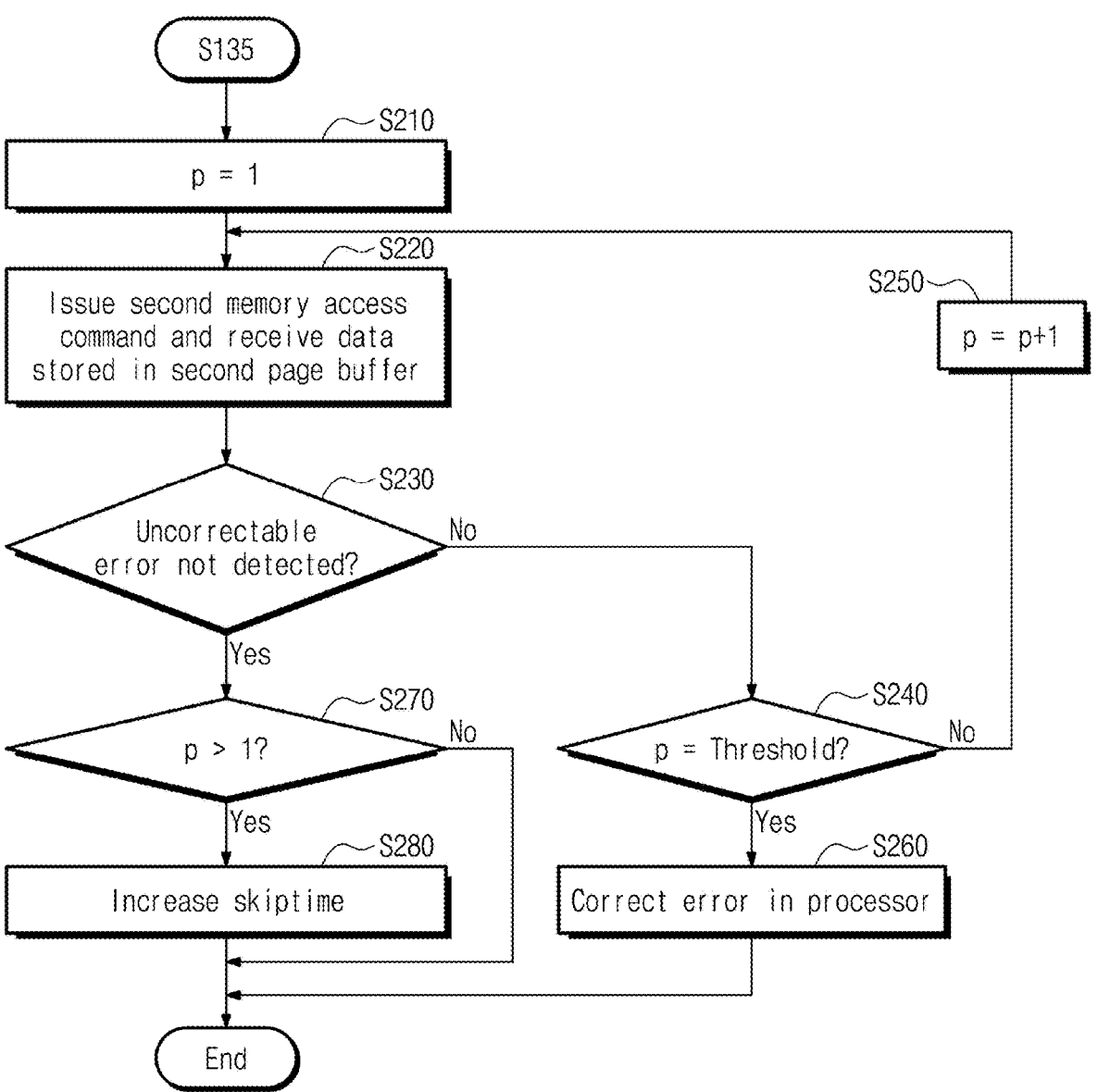
FIG. 14 is a flowchart illustrating an operation of a memory controller of FIG. 13 in detail.

FIG. 14 is a flowchart illustrating an operation of a memory controller of FIG. 13 in detail. Referring to FIGS. 1, 4 to 10, 13, and 14, after operation S135, a variable "p" may be set to "1" in operation S210. That is, below, how the memory controller 110 operates when it is determined to skip the issuing of the second status read command CMD_SR2 will be described.

In some example embodiments, the variable "p" is used to describe that the memory controller 110 repeatedly issues the memory access command, and the present inventive concepts are not limited thereto.

In some example embodiments, the variable "p" may be a count value of a counter (not illustrated) included in the recover circuit 111b.

In operation S220, the memory controller 110 may issue the memory access command corresponding to the second read command CMD_RD2 and may receive the data stored in the second page buffer PBb. In this case, the data received by the memory controller 110 in operation S220 may be referred to as "read data".

Operation S220 is similar to operation S170 and operation S180 described above, and thus, additional description will be omitted to avoid redundancy.

In operation S230, the memory controller 110 may determine whether an uncorrectable error (e.g., any uncorrectable error, at least one uncorrectable error, etc.) is included in the received read data. For example, when the error correction module 115 determines that the uncorrectable error is included in the received read data, operation S240 may be performed. When the error correction module 115 determines that the uncorrectable error is not included in the received read data, operation S270 may be performed.

In operation S240, the memory controller 110 may determine whether the variable "p" reaches a threshold value. The threshold value may indicate the maximum number of times that the recover circuit 111b requests the command manager CM to re-issue the memory access command. When it is determined that the variable "p" does not reach the threshold value, operation S250 may be performed. When it is determined that the variable "p" reaches the threshold value, operation S260 may be performed.

In operation S250, the memory controller 110 may increase the variable "p" as much as "1". For example, the recover circuit 111b may increase the count value of the variable "p" as much as "1". Afterwards, operation S220 may be again performed. That is, the memory controller 110 may again provide the memory access command to the nonvolatile memory device 120.

In operation S260, the memory controller 110 may attempt error correction through the processor 112. That is, the memory controller 110 may stop the iterative issuance of the memory access command. For example, the memory controller 110 may attempt the uncorrectable error correction through the firmware executed by the processor 112.

In operation S270, the memory controller 110 may determine whether the variable "p" is greater than "1". For example, the memory controller 110 may determine whether the uncorrectable error occurs in the read data because the skip time SKT is shorter than the read time RT. When it is determined that the variable "p" is greater than "1", operation S280 may be performed.

In operation S280, the memory controller 110 may increase the skip time SKT. For example, the recover circuit 111b may increase the skip time SKT stored in the compare circuit 111a.

That is, according to some example embodiments of the present inventive concepts, the skip time SKT may dynamically increase. In this case, the number of times that the uncorrectable error occurs because the read time RT is shorter than the skip time SKT may decrease.

In some example embodiments, the recover circuit 111b may be further configured to dynamically decrease the skip time SKT. For example, the memory controller 110 may skip the status check for each of a plurality of planes and may read the read data. The nonvolatile memory device 120 may output a plurality of read data respectively corresponding to a plurality of read commands. The uncorrectable error may not be included in the plurality of read data. In this case, the recover circuit 111b may be configured to determine that the skip time SKT is set to be excessively long and to decrease the skip time SKT. However, the present inventive concepts are not limited to the above example embodiments.

Figure 15:
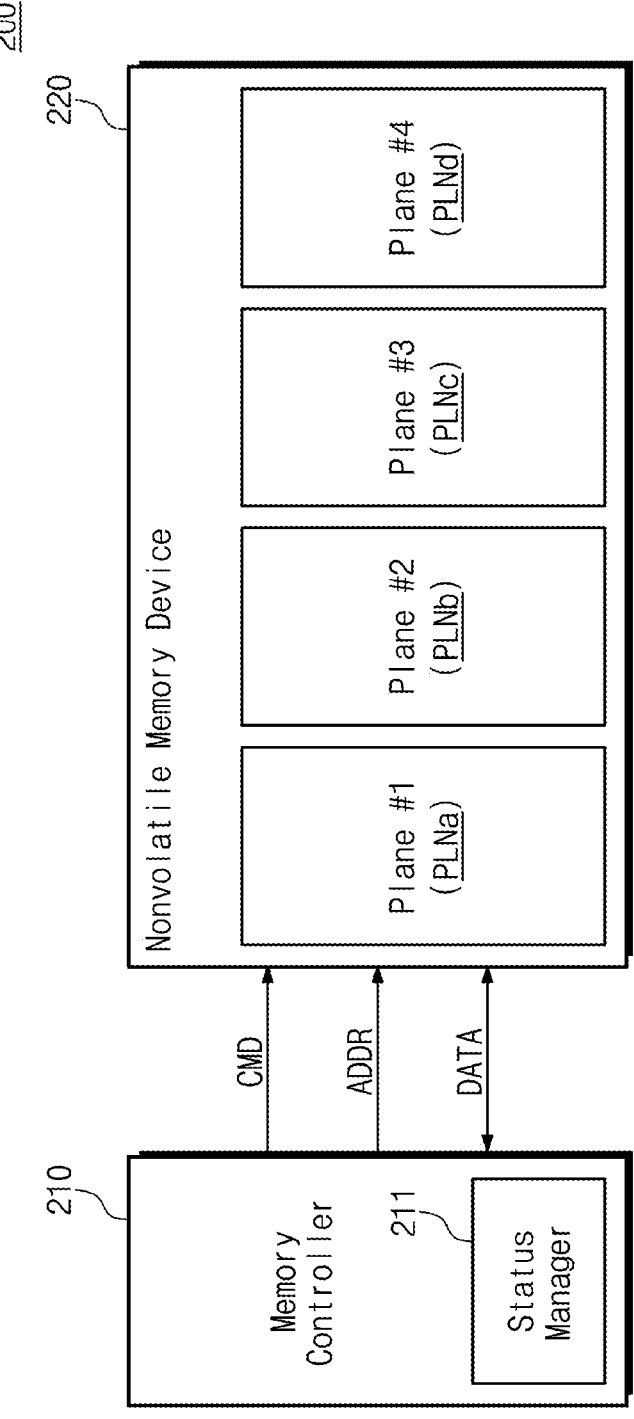
FIG. 15 is a block diagram illustrating a storage device according to some example embodiments of the present inventive concepts.

FIG. 15 is a block diagram illustrating a storage device according to some example embodiments of the present inventive concepts. Referring to FIG. 15, a storage device 200 may include a memory controller 210 and a nonvolatile memory device 220. The memory controller 210 may include a status manager 211.

The nonvolatile memory device 220 may include first to fourth planes PLNa to PLNd. Each of the first to fourth planes PLNa to PLNd may include a plurality of memory cells.

A configuration and a function of each component of the storage device 200 is similar to those described with reference to FIGS. 1 to 4, and thus, additional description will be omitted to avoid redundancy.

Figure 16:
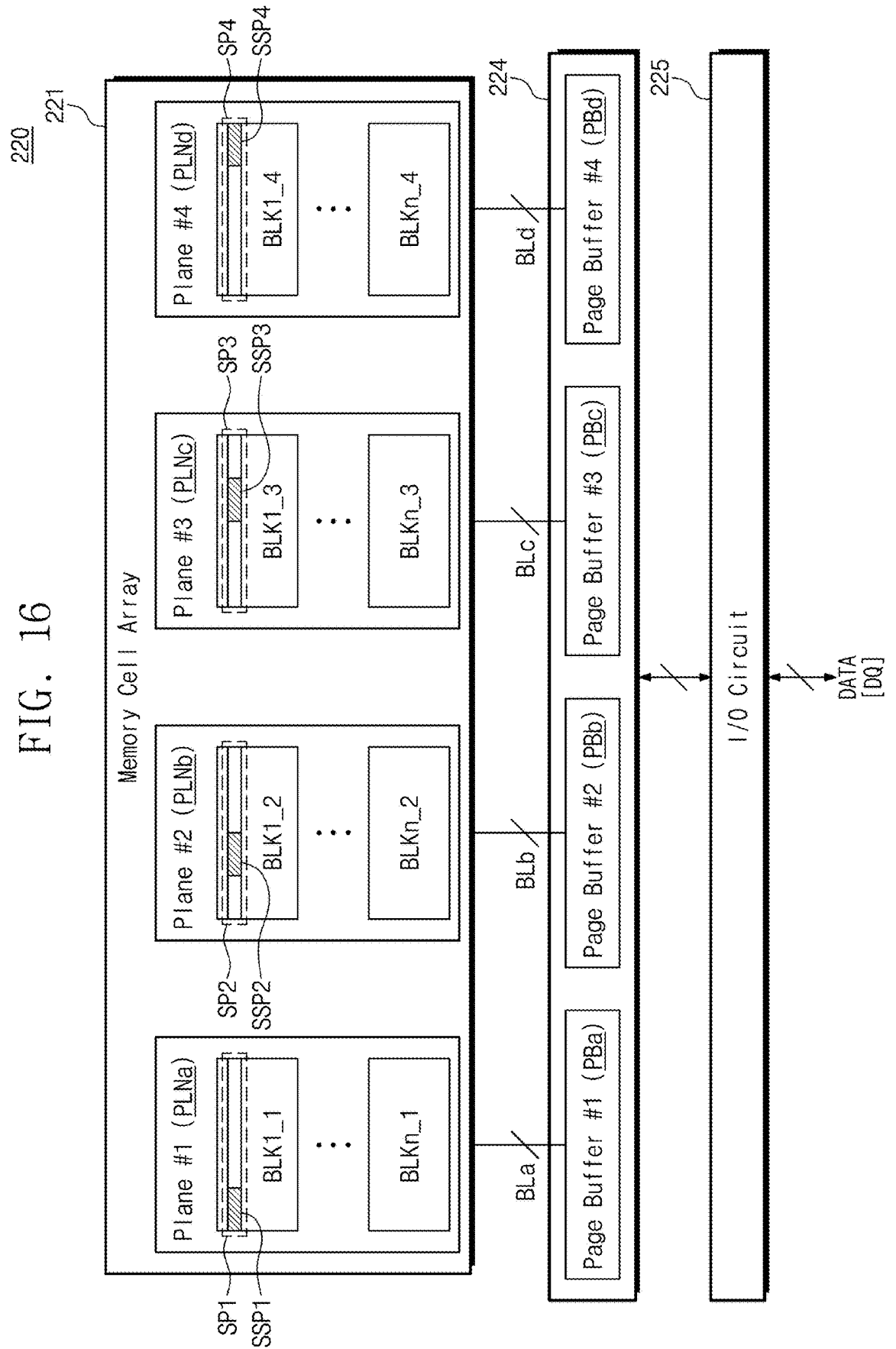
FIG. 16 is a block diagram illustrating a nonvolatile memory device of FIG. 15 performing an interleaving read operation.

FIG. 16 is a block diagram illustrating a nonvolatile memory device of FIG. 15 performing an interleaving read operation. Referring to FIGS. 1 to 5, 15, and 16, the nonvolatile memory device 220 may include a memory cell array 221, a page buffer circuit 224, and an input/output circuit 225.

Each of the first to fourth planes PLNa to PLNd may include a plurality of memory blocks. For example, the first plane PLNa may include the first memory blocks BLK1_1 to BLKn_1.

The page buffer circuit 224 may include first to fourth page buffers PBa to PBd. The first to fourth page buffers PBa to PBd may be connected to the first to fourth planes PLNa to PLNd through first to fourth bit lines BLa to BLd. Each of the first to fourth page buffers PBa to PBd may output the data read from the corresponding plane to the memory controller 210 through the input/output circuit 225.

Configurations and functions of the memory controller 210 and the nonvolatile memory device 220 are similar to the configurations and the functions of the memory controller 110 and the nonvolatile memory device 120 described with reference to FIGS. 1 to 5, and thus, additional description will be omitted to avoid redundancy.

The nonvolatile memory device 220 may perform the interleaving read operation under control of the memory controller 210. Below, an operation in which the nonvolatile memory device 220 performs the interleaving read operation on the first to fourth planes PLNa to PLNd will be described.

The nonvolatile memory device 220 may perform the read operation on first to fourth selection pages SP1 to SP4. For example, the nonvolatile memory device 220 may store the data of the first selection page SP1 in the first page buffer PBa in response to the first read command, may store the data of the second selection page SP2 in the second page buffer PBb in response to the second read command, may store the data of the third selection page SP3 in the third page buffer PBc in response to the third read command, and may store the data of the fourth selection page SP4 in the fourth page buffer PBd in response to the fourth read command.

In some example embodiments, each of the first to fourth selection pages SP1 to SP4 may be determined based on the address included in the command sequence of the corresponding read command.

The memory controller 210 may check the status of each of the first to fourth planes PLNa to PLNd. For example, the memory controller 210 may issue the status read command for each of the first to fourth planes PLNa to PLNd.

The nonvolatile memory device 220 may return the status information about one of the first to fourth planes PLNa to PLNd in response to the status read command. The status information of each of the first to fourth planes PLNa to PLNd is similar to that described with reference to FIGS. 1 to 5, and thus, additional description will be omitted to avoid redundancy.

In response to the received status information, the memory controller 210 may issue the memory access command for each of the first to fourth planes PLNa to PLNd. For example, when the returned status information of the first plane PLNa indicates the "ready state", the memory controller 210 may issue the memory access command for the first plane PLNa.

In some example embodiments, an address of data that the memory controller 210 intends to receive may be included in the command sequence of the memory access command for the first plane PLNa, which the memory controller 210 transmits. For example, information (e.g., a column address) about the address of the first sub-selection page SSP1 may be included in the command sequence of the memory access command for the first plane PLNa. In this case, the non-volatile memory device 120 may return the data corresponding to the first sub-selection page SSP1 from among the data stored in the first page buffer PBa to the memory controller 210. As in the above description, in response to the memory access commands for the second to fourth planes PLNb to PLNd, the nonvolatile memory device 220 may return information corresponding to second to fourth sub-selection pages SSP2 to SSP4 to the memory controller 210.

In some example embodiments, the capacity of each of the first to fourth selection pages SP1 to SP4 may be about 16 KB, and the capacity of each of the first to fourth sub-selection pages SSP1 to SSP4 may be about 4 KB. However, the present inventive concepts are not limited thereto.

In some example embodiments, the first to fourth planes PLNa to PLNd may share the plurality of data pins DQ. Accordingly, the first to fourth planes PLNa to PLNd and the memory controller 210 may sequentially exchange the command CMD and the data "DATA".

In some example embodiments, while the read data of a specific plane are output, the read operation for the remaining planes may be completed. For example, while the memory controller 210 receives the read data of the first plane PLNa, the read operation for the second to fourth planes PLNb to PLNd may be completed. In this case, even though the memory controller 210 skips the issuing of the status read command for the second to fourth planes PLNb to PLNd, the nonvolatile memory device 220 may output the read data that correspond to the second to fourth planes PLNb to PLNd and do not include the uncorrectable error. Some example embodiments in which the read operation for the remaining planes are completed while the read data of the specific plane are output will be described with reference to FIGS. 17 to 19.

In some example embodiments, while the read commands for the remaining planes are issued after the read command for the specific plane is issued, the read operation of the specific plane may be completed. For example, after the memory controller 210 issues the read command for the first plane PLNa, while the read commands for the second to fourth planes PLNb to PLNd are issued, the data of the first plane PLNa may be stored in the first page buffer PBa. In this case, even though the memory controller 210 skips the issuing of the status read command for the first plane PLNa, the read data that do not include the uncorrectable error may be read from the first plane PLNa. Some example embodiments in which after the read command for the specific plane is issued, the read operation of the specific plane is completed while the read commands for the remaining planes are issued will be described with reference to FIGS. 20 and 21.

FIG. 17 is a timing diagram illustrating an operation in which a memory controller and a nonvolatile memory device of FIG. 15 perform an interleaving read operation according to some example embodiments. Referring to FIGS. 1 to 8 and 15 to 17, the memory controller 210 and the nonvolatile memory device 220 may communicate with each other through the plurality of data pins DQ.

In the time period from the point in time "O1 to the point in time "A1", the memory controller 210 may sequentially transmit first to fourth read commands CMD_RD1 to CMD_RD4 to the nonvolatile memory device 220. The first to fourth read commands CMD_RD1 to CMD_RD4 may respectively correspond to the first to fourth planes PLNa to PLNd. For example, the command sequences of the first to fourth read commands CMD_RD1 to CMD_RD4 may respectively include the addresses of the first to fourth planes PLNa to PLNd.

In the time period from the point in time "A1" to the point in time "B1", the memory controller 210 may read first read data R-Data1 corresponding to the first plane PLNa from the nonvolatile memory device 220 by issuing follow-up commands associated with the first read command CMD_RD1. For example, the memory controller 210 may issue the first status read command CMD_SR1 for the first plane PLNa. The nonvolatile memory device 220 may return the first status information SR1 about the first plane PLNa to the memory controller 210 in response to the first status read command CMD_SR1. The memory controller 210 may issue the first memory access command CMD_MA1 for the first plane PLNa based on the first status information SR1. The first plane PLNa may output the first read data R-Data1 to the memory controller 110 through the plurality of data pins DQ in response to the first memory access command CMD_MA1.

As in the above description, in the time period from the point in time "B1" to the point in time "E1", the memory controller 110 may issue follow-up commands for the second to fourth read commands CMD_RD2 to CMD_RD4 and may read the read data of the second to fourth planes PLNb to PLNd from the nonvolatile memory device 220. Operations that the memory controller 210 and the nonvolatile memory device 220 perform in the time period from the point in time "B1" to the point in time "E1" are similar to those in the time period from the point in time "A1" to the point in time "B1", and thus, additional description will be omitted to avoid redundancy.

In some example embodiments, a time taken to output the first read data R-Data1 to the memory controller 110 may be longer than the skip time SKT. For example, the first read data R-Data1 are output to the memory controller 210 after the second read command CMD_RD2 is issued and before the second status read command CMD_SR2 is issued. In this case, the second status read command CMD_SR2 may be issued after a time longer than the skip time SKT passes from a point in time when the second read command CMD_RD2 is issued. Accordingly, as in the above description given with reference to FIG. 8, the probability that the second status information SR2 indicates the ready state may be high. Likewise, the probability that each of the third status information SR3 and the fourth status information SR4 indicates the ready state may be high. Accordingly, when the interleaving read operation is performed on a plurality of planes, the memory controller 210 may skip the issuing of the status read command for the remaining planes other than the plane from which the data are first read. An operation in which the memory controller 210 and the nonvolatile memory device 220 skip the issuing of the status read command with regard to a plurality of planes will be described in detail with reference to FIGS. 18 to 21.

Figure 18:
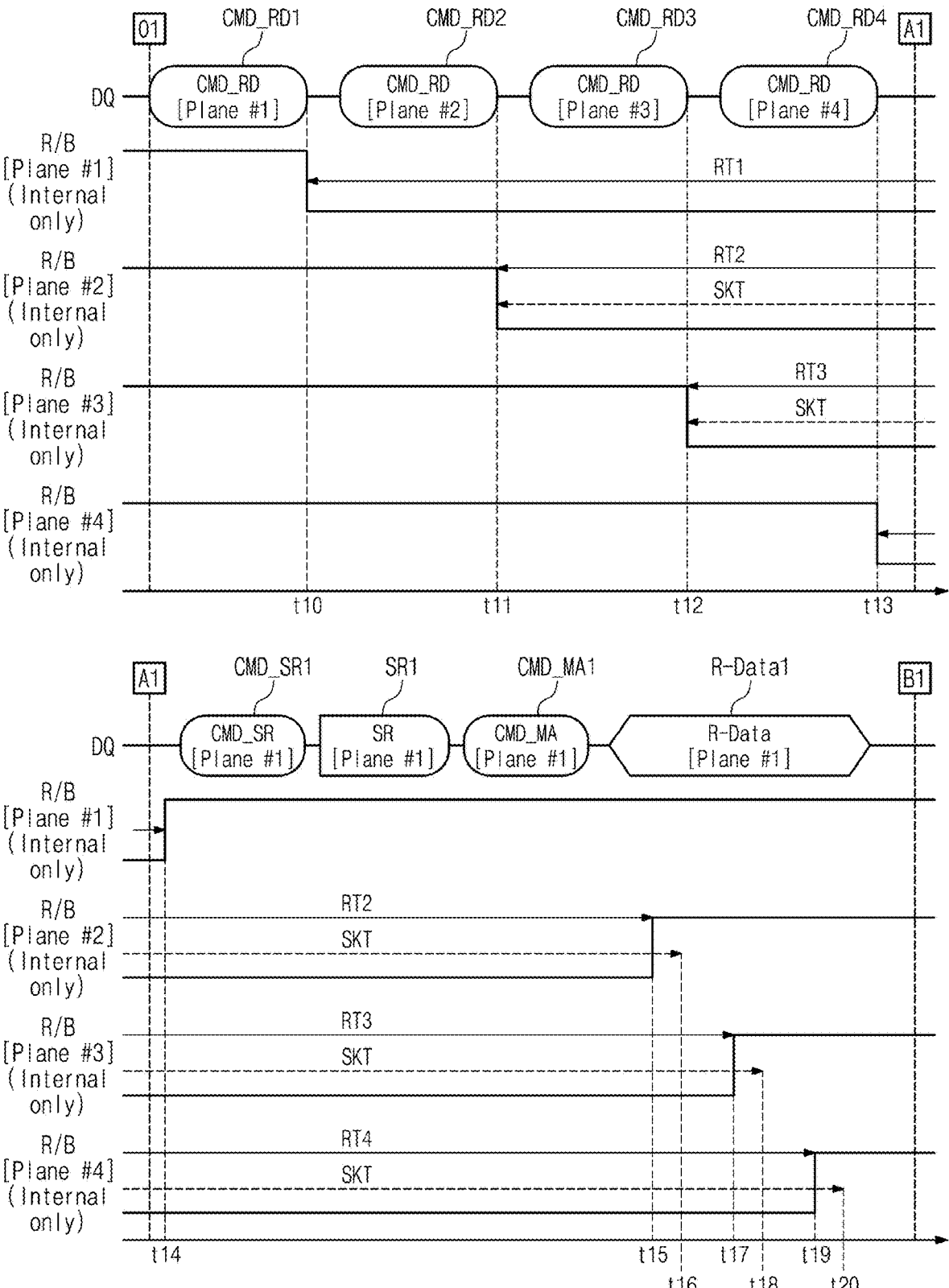
FIG. 18 is a timing diagram illustrating some of time periods of FIG. 17, according to some example embodiments.

FIG. 18 is a timing diagram illustrating some of time periods of FIG. 17, according to some example embodiments. Referring to FIGS. 1 to 8 and 15 to 18, in the time period from the point in time "O1" to the point in time "A1", the memory controller 210 may sequentially transmit the first to fourth read commands CMD_RD1 to CMD_RD4 to the nonvolatile memory device 220.

At a point in time t10, the nonvolatile memory device 220 may start the read operation of the first plane PLNa in response to the first read command CMD_RD1. In this case, the first plane PLNa may be in the busy state from the point in time t10. That is, at the point in time t10, the first plane internal R/B signal R/B[Plane #1] may transition to the logic low level.

As in the above description, at the point in time t11, the second plane internal R/B signal R/B[Plane #2] may transition to the logic low level; at the point in time t12, a third plane internal R/B signal R/B[Plane #3] may transition to the the logic low level; at the point in time t13, a fourth plane internal R/B signal R/B[Plane #4] may transition to the logic low level.

In the time period from the point in time "A1" to the point in time "B1", the memory controller 210 may issue a follow-up command of the first read command CMD_RD1 and may receive the first read data R-Data1 of the first plane PLNa. The pieces of information transmitted through the plurality of data pins DQ in the point in time "A1" to the point in time "B1" are similar to those described with reference to FIG. 17, and thus, additional description will be omitted to avoid redundancy.

At a point in time t14, the nonvolatile memory device 220 may complete the read operation of the first plane PLNa. For example, at the point in time t14, the nonvolatile memory device 220 may completely store the data of the first selection page SP1 in the first page buffer PBa. In this case, the first plane PLNa may be in the ready state from the point in time t14. That is, at the point in time t14, the first plane internal R/B signal R/B[Plane #1] may transition to the logic high level. The time period from t10 to t14 may be referred to as the "first read time RT1" corresponding to the first read command CMD_RD1.

As in the above description, the nonvolatile memory device 220 may complete the read operation of the second plane PLNb at a point in time t15, may complete the read operation of the third plane PLNc at a point in time t16, and may complete the read operation of the fourth plane PLNd at a point in time t19. In this case, the time period from t11 to t15 may be referred to as the "second read time RT2" corresponding to the second read command CMD_RD2, the time period from t12 to t17 may be referred to as a "third read time RT3" corresponding to the third read command CMD_RD3, and the time period from t13 to t19 may be referred to as a "fourth read time RT4" corresponding to the fourth read command CMD_RD4.

A point in time t16 may refer to a point in time when the skip time SKT passes from the point in time t11. A point in time t18 may refer to a point in time when the skip time SKT passes from the point in time t12. A point in time t20 may refer to a point in time when the skip time SKT passes from the point in time t13. In this case, as in the above description given with reference to FIG. 7, the skip time SKT may be set to be longer than the probability distribution average of the read time (e.g., two standard deviations longer, five standard deviations longer, etc.).

For brief description, FIG. 18 shows that the points in time t15 to t20 have a time-series order, but the present inventive concepts are not limited thereto. For example, the order of the points in time t15, t17, and t19 may be differently determined depending on lengths of read times of the second to fourth selection pages SP2 to SP4.

In some example embodiments, a time taken to transmit the first read data R-Data1 to the memory controller 210 may be longer than a time taken to exchange any other information (e.g., other commands or status information).

In some example embodiments, some of the points in time t15 to t20 may not be included in the time period in which the first read data R-Data1 are output to the memory controller 110 through the plurality of data pins DQ. However, for brief description, some example embodiments in which the points in time t15 to t20 are included in the time period in which the first read data R-Data1 are output to the memory controller 110 through the plurality of data pins DQ will be described representatively.

The point in time "B1" may refer to a point in time after the skip time SKT passes from the point in time t11 when the second read command CMD_RD2 is issued. In this case, the second plane PLNb may have the ready state with a high probability at the point in time "B1". As in the above description, each of the third and fourth planes PLNc and PLNd may have the ready state with a high probability at the point in time "B1".

That is, even though the memory controller 210 does not issue the second to fourth status read commands CMD_SR2 to CMD_SR4, the memory controller 210 may predict that the second to fourth planes PLNb to PLNd are in the ready state. Accordingly, in the time period from the point in time "B1" to the point in time "E1", the memory controller 210 may skip the issuing of the second to fourth status read commands CMD_SR2 to CMD_SR4.

Figure 19:
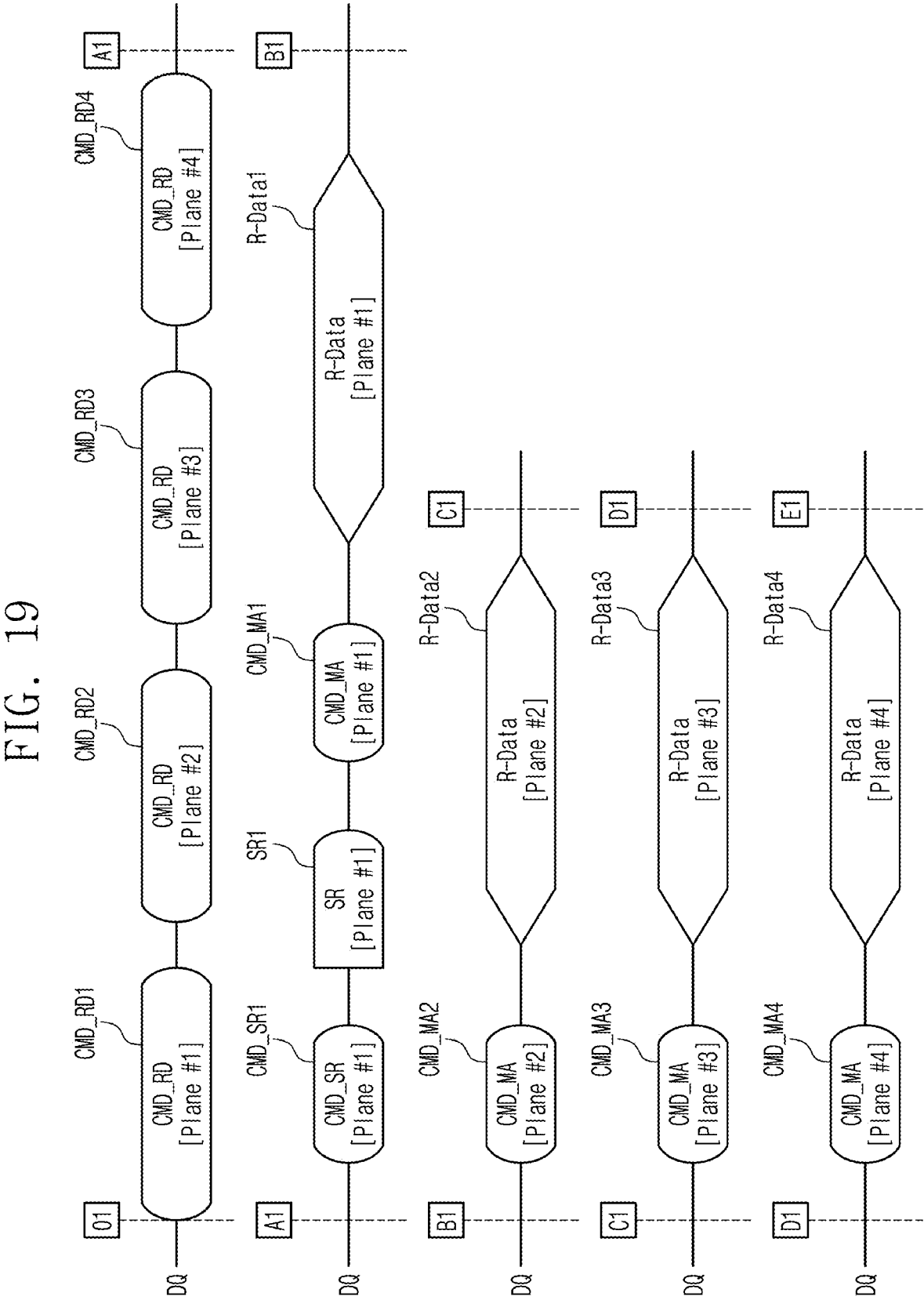
FIG. 19 is a timing diagram illustrating an operation in which a memory controller and a nonvolatile memory device of FIG. 15 perform an interleaving read operation based on a skip time, according to some example embodiments of the present inventive concepts.

FIG. 19 is a timing diagram illustrating an operation in which a memory controller and a nonvolatile memory device of FIG. 15 perform an interleaving read operation based on a skip time, according to some example embodiments of the present inventive concepts. The operations of the memory controller 210 and the nonvolatile memory device 220 in the time period from the point in time "O1" to the point in time "A1" and the time period from the point in time "A1" to the point in time "B1" are described with reference to FIGS. 15 to 18, and thus, additional description will be omitted to avoid redundancy.

Referring to FIGS. 1 to 8 and 15 to 19, in the time period from the point in time "B1" to the point in time "C1", the memory controller 210 may skip the issuing of the second status read command CMD_SR2 and may issue the second memory access command CMD_MA2. In this case, the second plane PLNb may output the second read data R-Data2 to the memory controller 210 in response to the second memory access command CMD_MA2.

In some example embodiments, when the issuing of the second status read command CMD_SR2 is skipped, the length of the time period from the point in time "B1" to the point in time "C1" may decrease. For example the length of the time period from the point in time "B1" to the point in time "C1" may be shorter than the length of the time period from the point in time "A1" to the point in time "B1".

As in the above description, in the time period from the point in time "C1" to the point in time "D1", the memory controller 210 may skip the issuing of the third status read command CMD_SR3 and may issue the third memory access command CMD_MA3. In the time period from the point in time "D1" to the point in time "E1", the memory controller 210 may skip the issuing of the fourth status read command CMD_SR4 and may issue the fourth memory access command CMD_MA4. According to the above description, a time taken to perform the interleaving read operation on the first to fourth planes PLNa to PLNd may decrease. Accordingly, according to some example embodiments of the present inventive concepts, the read speed of the nonvolatile memory device 220 may be improved, thereby improving the operational performance and/or efficiency of the storage device 100 and any electronic device, computing device, or the like including same, and furthermore reducing power consumption by the storage device 100 and any electronic device, computing device, or the like including same based on omitting status read command transmissions, status information transmissions, processing of status information at the memory controller 110, etc. to prompt transmission of memory access commands.

Figure 20:
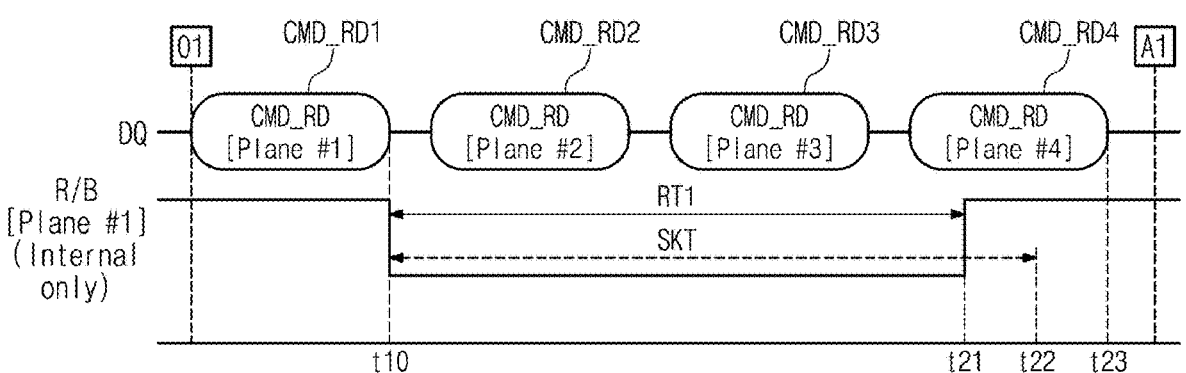
FIG. 20 is a timing diagram illustrating some of time periods of FIG. 17, according to some example embodiments.

FIG. 20 is a timing diagram illustrating some of time periods of FIG. 17, according to some example embodiments. Referring to FIGS. 1 to 8, 15 to 17, and 20, in the time period from the point in time "O1" to the point in time "A1", the memory controller 210 may sequentially transmit the first to fourth read commands CMD_RD1 to CMD_RD4 to the nonvolatile memory device 120.

At the point in time t10, the nonvolatile memory device 220 may start the read operation of the first plane PLNa. In this case, the first plane PLNa may be in the busy state from the point in time t10. That is, at the point in time t10, the first plane internal R/B signal R/B[Plane #1] may transition to the logic low level.

Unlike some example embodiments, including the example embodiments illustrated in FIG. 18, the nonvolatile memory device 220 may complete the read operation of the first plane PLNa at a point in time t21. For example, at the point in time t21, the nonvolatile memory device 220 may completely store the data of the first selection page SP1 in the first page buffer PBa. In this case, the first plane PLNa may be in the ready state from the point in time t21. That is, at the point in time t21, the first plane internal R/B signal R/B[Plane #1] may transition to the logic high level. That is, the time period from t10 to t21 may be the first read time RT1 corresponding to the first read command CMD_RD1.

A point in time t22 may refer to a point in time when the skip time SKT passes from the point in time t10.

In some example embodiments, a time taken to issue the second to fourth read commands CMD_RD2 to CMD_RD4 may be longer than the skip time SKT. For example, a point in time t23 when the second to fourth read commands CMD_RD2 to CMD_RD4 are transmitted to the nonvolatile memory device 120 may be after the point in time t22. In this case, the memory controller 110 may skip the issuing of the first status read command CMD_SR1. That is, the probability distribution average of the read time according to some example embodiments of FIG. 20 is smaller than the probability distribution average of the read time according to some example embodiments of FIG. 18, and thus, some example embodiments in which the shorter skip time SKT is applied is described with reference to FIG. 20. However, the present inventive concepts are not limited thereto.

Accordingly, even though the memory controller 210 does not issue the first status read command CMD_SR1, the memory controller 110 may predict that the first plane PLNa is in the ready state. In this case, the memory controller 210 may also skip the issuing of the first status read command CMD_SR1 in the time period from the point in time "A1" to the point in time "B1".

Figure 21:
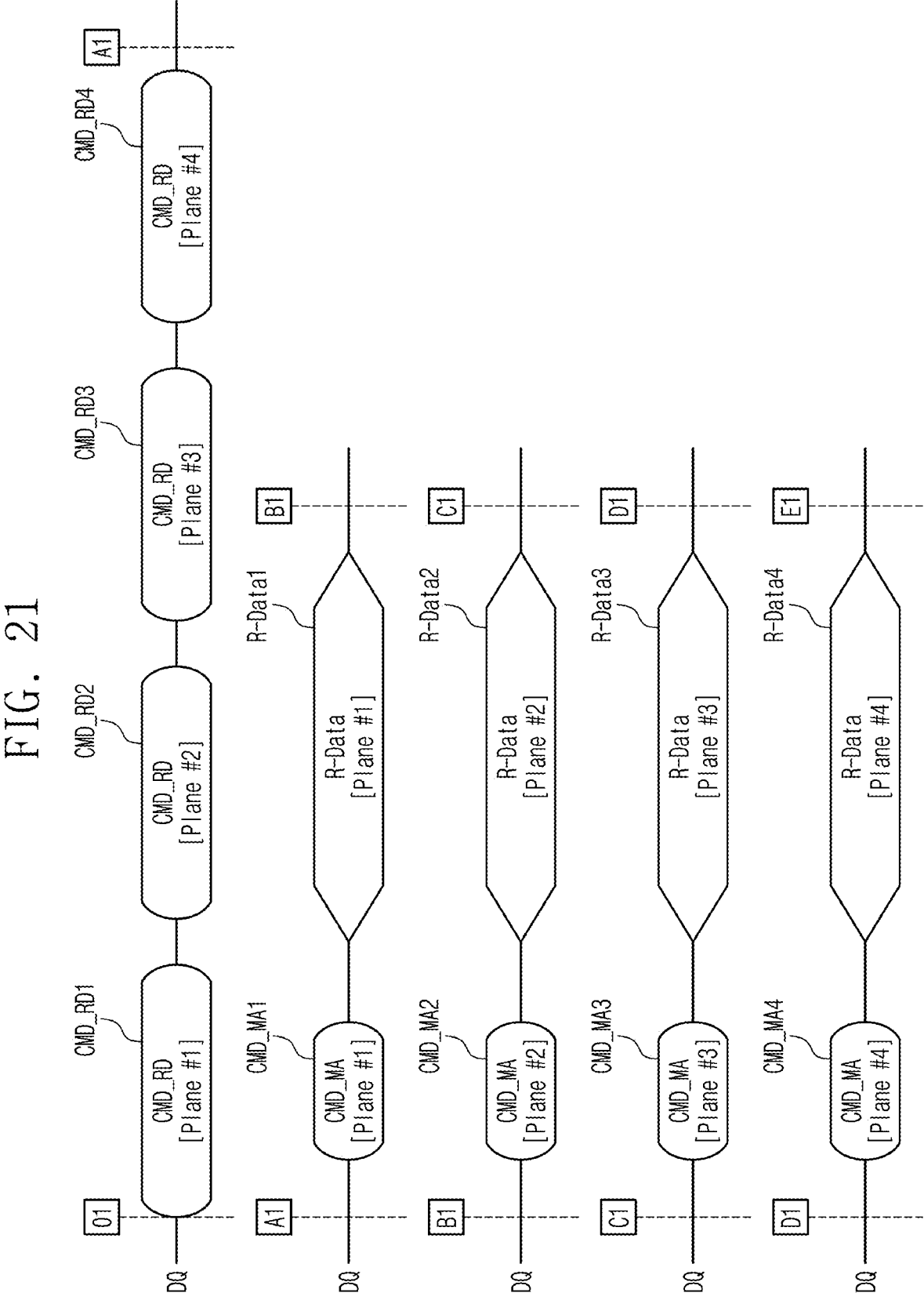
FIG. 21 is a timing diagram illustrating operations of a memory controller and a nonvolatile memory device according to some example embodiments of FIG. 20.

FIG. 21 is a timing diagram illustrating operations of a memory controller and a nonvolatile memory device according to some example embodiments, including the example embodiments of FIG. 20. Referring to FIGS. 1 to 8, 15 to 17, 20, and 21, in the time period from the point in time "A1" to the point in time "B1", the memory controller 210 may skip the issuing of the first status read command CMD_SR1.

The operations of the memory controller 210 and the nonvolatile memory device 220 in the time period from the point in time "O1" to the point in time "A1" and the time period from the point in time "B1" to the point in time "E1" are described with reference to FIG. 19, and thus, additional description will be omitted to avoid redundancy.

According to some example embodiments, including the example embodiments of FIGS. 20 and 21, the length of the time period from the point in time "A1" to the point in time "B1" may decrease compared to some example embodiments described with reference to FIG. 19. In this case, the speed at which the nonvolatile memory device 220 performs the interleaving read operation may be improved, thereby improving the operational performance and/or efficiency of the storage device 100 and any electronic device, computing device, or the like including same, and furthermore reducing power consumption by the storage device 100 and any electronic device, computing device, or the like including same based on omitting status read command transmissions, status information transmissions, processing of status information at the memory controller 110, etc.

FIG. 22 is a timing diagram illustrating an operation in which a memory controller and a nonvolatile memory device of FIG. 15 perform an interleaving read operation according to some example embodiments. Referring to FIGS. 1 to 8, 15 to 16, and 22, in the time period from the point in time "O2" to the point in time "A2", the memory controller 210 may sequentially transmit the first to fourth read commands CMD_RD1 to CMD_RD4 to the nonvolatile memory device 220.

In the time period from the point in time "A2" to the point in time "B2" and the time period from the point in time "B2" to the point in time "C2", the memory controller 210 may sequentially check the statuses of the first to fourth planes PLNa to PLNd. For example, the memory controller 210 may sequentially output the first status read command CMD_SR1 for the first plane PLNa, the second status read command CMD_SR2 for the second plane PLNb, the third status read command CMD_SR3 for the third plane PLNc, and the fourth status read command CMD_SR4 for the fourth plane PLNd.

Afterwards, in the time period from the point in time "C2" to the point in time "D2", the memory controller 210 may sequentially read the read data of the first plane PLNa and the read data of the second plane PLNb from the nonvolatile memory device 220.

As in the above description, in the time period from the point in time "D2" to the point in time "E2", the memory controller 210 may sequentially read from the read data of the third plane PLNc and the read data of the fourth plane PLNd.

That is, according to some example embodiments of FIG. 22, the memory controller 210 may be configured to sequentially read data of a plurality of planes after checking statuses of the plurality of planes. In this case, as in the above description given with reference to FIGS. 17 to 19, because the first read data R-Data1 are read after the second to fourth read commands CMD_RD2 to CMD_RD4 are issued and before the second to fourth memory access commands CMD_MA2 to CMD_MA4 are issued, the memory controller 210 may be configured to skip the issuing of the second to fourth status read commands CMD_SR2 to CMD_SR4. In this case, the nonvolatile memory device 220 and the memory controller 210 may communicate with each other through the plurality of data pins DQ to be similar to the scheme described with reference to FIG. 19.

Figure 23:
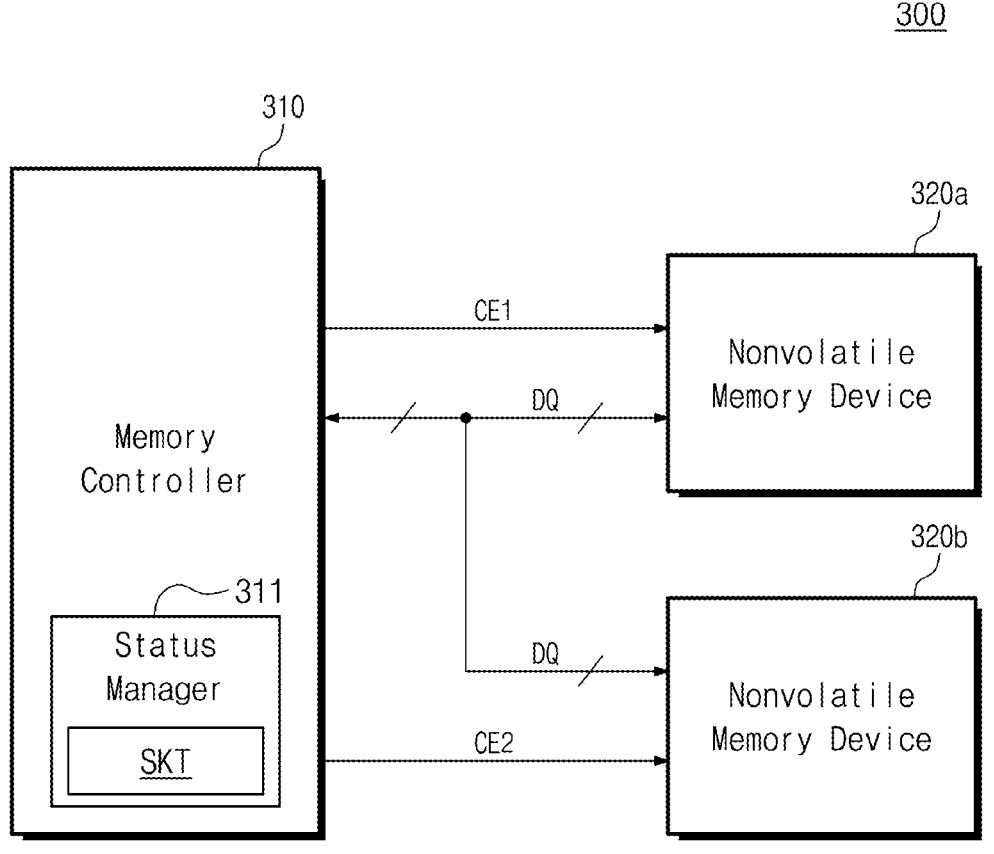
FIG. 23 is a block diagram illustrating a storage device according to some example embodiments.

FIG. 23 is a block diagram illustrating a storage device according to some example embodiments. Referring to FIG. 23, a storage device 300 may include a memory controller 310, a first nonvolatile memory device 320a, and a second nonvolatile memory device 320b. The memory controller 310 may include a status manager 311. The memory controller 310 may communicate with the first nonvolatile memory device 320a and the second nonvolatile memory device 320b through the plurality of data pins DQ.

In some example embodiments, at least one of the first nonvolatile memory device 320a or the second nonvolatile memory device 320b may be implemented to be similar to the scheme of the nonvolatile memory device 120 or the nonvolatile memory device 220 described with reference to FIGS. 1 to 22.

The status manager 311 may manage commands that the memory controller 310 will issue to the first and second nonvolatile memory devices 320a and 320b. A configuration and an operation of the status manager 311 may be similar to those described with reference to FIGS. 1 to 22. For example, when the interleaving read operation is performed on planes in the first nonvolatile memory device 320a or the second nonvolatile memory device 320b, the status manager 311 may allow the memory controller 310 to skip the check of status information about some planes. In this case, the speed at which the first nonvolatile memory device 320a and the second nonvolatile memory device 320b perform the interleaving read operation may be improved.

The memory controller 310 may transmit a first chip enable signal CE1 to the first nonvolatile memory device 320a. The first nonvolatile memory device 320a may communicate with the memory controller 310 through the plurality of data pins DQ based on the first chip enable signal CE1. For example, the first nonvolatile memory device 320a may exchange a command, an address, or data with the memory controller 310 through the plurality of data pins DQ based on the first chip enable signal CE1.

The memory controller 310 may transmit a second chip enable signal CE2 to the second nonvolatile memory device 320b. The second nonvolatile memory device 320b may communicate with the memory controller 310 through the plurality of data pins DQ based on the second chip enable signal CE2. For example, the second nonvolatile memory device 320b may exchange a command, an address, or data with the memory controller 310 through the plurality of data pins DQ based on the second chip enable signal CE2.

In some example embodiments, the first nonvolatile memory device 320a and the second nonvolatile memory device 320b may operate in the same operation mode. For example, the first nonvolatile memory device 320a and the second nonvolatile memory device 320b may operate a single level cell (SLC) mode. In this case, read times of the first nonvolatile memory device 320a and the second nonvolatile memory device 320b may have similar probability distributions. For example, an average of the probability of the read time of the first nonvolatile memory device 320a may be identical to an average of the probability of the read time of the second nonvolatile memory device 320b.

Accordingly, the status manager 311 may apply the single skip time SKT to the first nonvolatile memory device 320a and the second nonvolatile memory device 320b. Because the single skip time SKT is applied to a plurality of nonvolatile memory devices, the complexity of the memory controller 310 may decrease.

Figure 24:
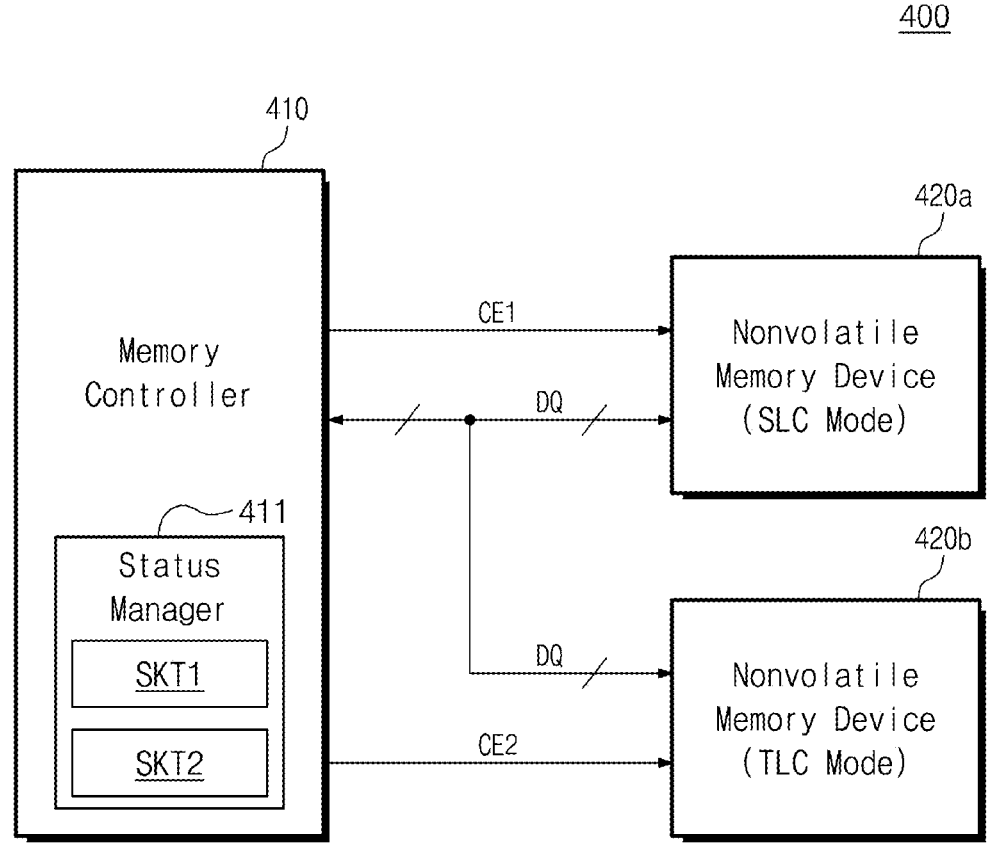
FIG. 24 is a block diagram illustrating a storage device according to some example embodiments.

FIG. 24 is a block diagram illustrating a storage device according to some example embodiments. Referring to FIG. 24, a storage device 400 may include a memory controller 410, a first nonvolatile memory device 420a, and a second nonvolatile memory device 420b. The memory controller 410 may include a status manager 411. The memory controller 410 may communicate with the first nonvolatile memory device 420a and the second nonvolatile memory device 420b through the plurality of data pins DQ. The memory controller 410 may provide the first chip enable signal CE1 and the second chip enable signal CE2 to the first nonvolatile memory device 420a and the second nonvolatile memory device 420b, respectively. An operation of a nonvolatile memory device according to the first and second chip enable signals CE1 and CE2 is similar to that described with reference to FIG. 23, and thus, additional description will be omitted to avoid redundancy.

In some example embodiments, at least one of the first nonvolatile memory device 420a and the second nonvolatile memory device 420b may be implemented to be similar to the scheme of the nonvolatile memory device 120 or the nonvolatile memory device 220 described and the reference to FIGS. 1 to 22.

The first nonvolatile memory device 420a and the second nonvolatile memory device 420b may operate in different operation modes. For example, the first nonvolatile memory device 420a may operate in the SLC mode, and the second nonvolatile memory device 420b may operate in a triple level cell (TLC) mode. For brief description, below, some example embodiments in which the first nonvolatile memory device 420a operates in the SLC mode and the second nonvolatile memory device 420b operates in the TLC mode will be described representatively. However, the present inventive concepts are not limited thereto. For example, the first nonvolatile memory device 420a and the second nonvolatile memory device 420b may have two different modes among various modes such as the SLC mode, a multi-level cell (MLC) mode, the TLC mode, a quad level cell (QLC) mode, and a penta-level cell (PLC) mode.

In some example embodiments, read times of the first nonvolatile memory device 420a and the second nonvolatile memory device 420b may have different probability distributions. For example, an average of the probability of the read time of the second nonvolatile memory device 420b may be higher than an average of the probability of the read time of the first nonvolatile memory device 420a.

The status manager 411 may manage commands that the memory controller 410 will issue to the first and second nonvolatile memory devices 420a and 420b, based on first and second skip times SKT1 and SKT2. For example, the status manager 411 may apply the first skip time SKT1 to the first nonvolatile memory device 420a and may apply the second skip time SKT2 to the second nonvolatile memory device 420b.

In some example embodiments, the second skip time SKT2 may be longer than the first skip time SKT1.

In some example embodiments, an operation of the status manager 411 may be similar to that described with reference to FIGS. 1 to 22. For example, when the read operation is performed on a plane of the first nonvolatile memory device 420a, the status manager 411 may determine whether to skip the check of status information, based on the first skip time SKT1. In this case, the speed at which the first nonvolatile memory device 420a performs the read operation may be improved. Also, when the read operation is performed on a plane of the second nonvolatile memory device 420b, the status manager 411 may determine whether to skip the check of status information, based on the second skip time SKT2. In this case, the speed at which the second nonvolatile memory device 420b performs the read operation may be improved.

According to some example embodiments of the present inventive concepts, a memory controller skipping issuing of a follow-up command corresponding to a read command and an operation method thereof may be provided. Accordingly, according to some example embodiments of the present inventive concepts, the read speed of a nonvolatile memory device may be improved.

As described herein, any devices, systems, units, blocks, circuits, controllers, processors, and/or portions thereof according to any of the example embodiments (including, for example, the storage device 100, the memory controller 110, the status manager 111, the compare circuit 111a, the recover circuit 111b, the timer 111c, the processor 112, the dynamic random access memory (DRAM) interface 113, the host interface layer 114, the error correction module 115, the static random access memory (SRAM) 116, the nonvolatile memory device interface 117, the CMD manager CM, the nonvolatile memory device 120, a memory cell array 121, the peripheral circuit PERI, the address decoder 122, the control logic circuit 123, the page buffer circuit 124, the input/output (I/O) circuit 125, the storage device 200, the memory controller 210, the status manager 211, the nonvolatile memory device 220, the memory cell array 221, the page buffer circuit 224, the input/output circuit 225, the storage device 300, the memory controller 310, the status manager 311, the first nonvolatile memory device 320a, the second nonvolatile memory device 320b, the storage device 400, the memory controller 410, the status manager 411, the first nonvolatile memory device 420a, the second nonvolatile memory device 420b, any portion thereof, or the like) may include, may be included in, and/or may be implemented by one or more instances of processing circuitry such as hardware including logic circuits; a hardware/software combination such as a processor executing software; or any combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory, a DRAM device, etc.), storing a program of instructions, and a processor (e.g., CPU) configured to execute the program of instructions to implement the functionality and/or methods performed by some or all of any devices, systems, units, blocks, circuits, controllers, processors, and/or portions thereof according to any of the example embodiments.

While the present inventive concepts have been described with reference to some example embodiments thereof, it will be apparent to those of ordinary skill in the art that various changes and modifications may be made thereto without departing from the spirit and scope of the present inventive concepts as set forth in the following claims.

What is claimed is:

1. An operation method of a memory controller which controls a nonvolatile memory device including a first plane and a second plane to perform an interleaving read operation on the first plane and the second plane, the operation method comprising:

sequentially transmitting a first read command for the first plane and a second read command for the second plane to the nonvolatile memory device;

transmitting a first status read command corresponding to the first read command to the nonvolatile memory device;

transmitting a first memory access command corresponding to the first read command to the nonvolatile memory device, based on first status information output from the nonvolatile memory device in response to the first status read command;

receiving first read data that is output from the nonvolatile memory device in response to the first memory access command;

after receiving the first read data, skipping issuing of a status read command corresponding to the second read command based at least on an elapsed time after the second read command is received by the nonvolatile memory device and transmitting a second memory access command corresponding to the second read command to the nonvolatile memory device; and receiving second read data that is output from the nonvolatile memory device in response to the second memory access command.

2. The operation method of claim 1, wherein the first plane includes a first page, wherein the second plane includes a second page, wherein the nonvolatile memory device further includes:

a first page buffer connected to the first plane; and a second page buffer connected to the second plane, wherein the nonvolatile memory device is configured to:

store data of the first page in the first page buffer during a first read time from a first point in time when the first read command is received at the nonvolatile memory device; and store data of the second page in the second page buffer during a second read time from a second point in time when the second read command is received at the nonvolatile memory device.

3. The operation method of claim 2, wherein a skip time is determined based on a probability distribution associated with lengths of the first read time and the second read time.

4. The operation method of claim 3, wherein the probability distribution is a normal distribution, and wherein the skip time is longer than an average of the probability distribution.

5. The operation method of claim 2, wherein the first read data are a portion of the data of the first page, and the second read data are a portion of the data of the second page.

6. The operation method of claim 2, wherein the memory controller is configured to:

store a skip time, and compare the elapsed time after the second point in time with the skip time to determine whether to skip issuing of the status read command corresponding to the second read command.

7. The operation method of claim 6, wherein the memory controller is configured to:

in response to a determination that the elapsed time is longer than the skip time, skip the issuing of the status read command corresponding to the second read command.

8. The operation method of claim 1, further comprising:

determining whether any uncorrectable error is included in the second read data;

in response to a determination that at least one uncorrectable error is included in the second read data, transmitting a third memory access command having a same configuration as the second memory access command; and receiving third read data that is output from the nonvolatile memory device in response to the third memory access command.

9. The operation method of claim 8, further comprising:

determining whether any uncorrectable error is included in the third read data; and in response to a determination that the third read data does not include any uncorrectable error, increasing a skip time.

10. An operation method of a memory controller which controls a nonvolatile memory device including a first plane and a second plane, the operation method comprising:

transmitting a first read command for the first plane and a second read command for the second plane to the nonvolatile memory device;

reading first read data corresponding to the first plane from the nonvolatile memory device in response to a determination that status information of the first plane indicates a ready state; and after reading the first read data of the first plane, reading second read data corresponding to the second plane from the nonvolatile memory device without checking status information of the second plane based on an elapsed time after a point in time when the second read command is transmitted.

11. The operation method of claim 10, wherein the memory controller stores a skip time, and wherein the operation method further includes, in response to a determination that the elapsed time is longer than the skip time, performing the reading of the second read data of the second plane without checking the status information of the second plane.

12. The operation method of claim 11, wherein the operation method further includes, in response to a determination that the elapsed time is shorter than the skip time, performing the reading of the second read data after checking the status information of the second plane.

13. The operation method of claim 11, further comprising:

determining whether any uncorrectable error is included in the second read data; and in response to a determination that the second read data does not include any uncorrectable error, reading third read data corresponding to the second plane from the nonvolatile memory device.

14. The operation method of claim 13, further comprising:

determining whether any uncorrectable error is included in the third read data; and in response to a determination that the third read data does not include any uncorrectable error, increasing the skip time.

15. The operation method of claim 10, wherein the first plane includes a first page, wherein the second plane includes a second page, and wherein the nonvolatile memory device further includes a first page buffer connected to the first plane and a second page buffer connected to the second plane.

16. The operation method of claim 15, wherein the nonvolatile memory device is configured to:

store data of the first page in the first page buffer in response to the first read command; and store data of the second page in the second page buffer in response to the second read command, wherein the first read data are a portion of the data of the first page, and wherein the second read data are a portion of the data of the second page.

17. A memory controller, comprising:

a command manager configured to output a first read command to control a nonvolatile memory device; and a status manager including a timer configured to measure a first elapsed time from a first point in time when the first read command is output, and a compare circuit configured to store a skip time, wherein the compare circuit is configured to compare the measured first elapsed time with the skip time to generate a first control signal, and wherein the command manager is configured to, based on the first control signal, skip issuing of a first status read command associated with the first read command, and output a first memory access command associated with the first read command.

18. The memory controller of claim 17, wherein the compare circuit is configured to generate the first control signal to have a first logic level in response to a determination that the first elapsed time is longer than the skip time, and generate the first control signal to have a second logic level different from the first logic level in response to a determination that the first elapsed time is shorter than the skip time, and wherein, in response to the first control signal having the first logic level, the command manager is configured to:

skip the issuing of the first status read command associated with the first read command, and output the first memory access command associated with the first read command.

19. The memory controller of claim 17, further comprising:

an error correction module configured to determine whether first read data output from the nonvolatile memory device in response to the first memory access command includes any uncorrectable error, wherein the status manager further includes:

a recover circuit configured to control the command manager based on a result of a determination that the first read data includes at least one uncorrectable error such that a second memory access command that is identical to the first memory access command is output.

20. The memory controller of claim 19, wherein the error correction module is further configured to determine whether any uncorrectable error is included in second read data that is output in response to the second memory access command, and wherein the recover circuit is configured to, in response to a determination that the second read data does not include any uncorrectable error, increase the skip time.

* * * * *